United States Patent
Watanabe et al.

(10) Patent No.: US 12,372,461 B2
(45) Date of Patent: Jul. 29, 2025

(54) IMAGING DEVICE, INSPECTION DEVICE, AND IMAGING METHOD

(71) Applicants: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

(72) Inventors: Tohru Watanabe, Gifu-ken (JP); Hideki Ota, Tokyo (JP); Kunimitsu Toyoshima, Osaka (JP)

(73) Assignees: KABUSHIKI KAISHA N-TECH, Gifu-ken (JP); KABUSHIKI KAISHA YAKULT HONSHA, Tokyo (JP); TOHOSHOJI KABUSHIKI KAISHA, Osaka (JP)

( * ) Notice: Subject to any disclaimer, the term of this patent is extended or adjusted under 35 U.S.C. 154(b) by 246 days.

(21) Appl. No.: 18/038,703

(22) PCT Filed: Nov. 11, 2021

(86) PCT No.: PCT/JP2021/041594
§ 371 (c)(1),
(2) Date: May 24, 2023

(87) PCT Pub. No.: WO2022/113758
PCT Pub. Date: Jun. 2, 2022

(65) Prior Publication Data
US 2024/0027340 A1    Jan. 25, 2024

(30) Foreign Application Priority Data
Nov. 27, 2020   (JP) ................................. 2020-197621

(51) Int. Cl.
*G01N 21/88* (2006.01)
*G01N 21/3577* (2014.01)
(Continued)

(52) U.S. Cl.
CPC ..... *G01N 21/3577* (2013.01); *G01N 21/8803* (2013.01); *H04N 23/11* (2023.01);
(Continued)

(58) Field of Classification Search
CPC .......... G01N 21/3577; G01N 21/8803; G01N 21/90; G01N 21/909; H04N 23/11;
(Continued)

(56) References Cited

U.S. PATENT DOCUMENTS 10,422,755 B2 *  9/2019  Sones ..................... G01N 21/90
11,651,505 B2 *  5/2023  Kempf ................. H04N 13/218
                                                    348/48
(Continued)

FOREIGN PATENT DOCUMENTS

CN    103743757 A    4/2014
JP    H09-169392 A   6/1997
(Continued)

OTHER PUBLICATIONS

International Search Report for PCT/JP2021/041594, mailed Feb. 1, 2022.

*Primary Examiner* — Abdullahi Nur
(74) *Attorney, Agent, or Firm* — MARSHALL, GERSTEIN & BORUN LLP

(57) ABSTRACT

An imaging device includes a camera, light sources, an optical bandpass filter, and a conversion unit. The camera includes an image sensor including a N-band color filter (where N is a natural number greater than or equal to 3). The M types of light sources (where M is a natural number that satisfies 2≤M≤N) have the emission spectral characteristics of having respective peaks in mutually different wavelength ranges within a visible light range and a near-infrared range. The conversion unit generates image signals of M bands each having spectral sensitivity to the corresponding one of (Continued)

the mutually different wavelength ranges by performing a matrix operation on an N-band imaging signal obtained by the image sensor when an article is photographed with the camera. The light application direction and the emission intensity are individually selected for each of the light sources.

9 Claims, 8 Drawing Sheets

(51) Int. Cl.
    *H04N 23/11*   (2023.01)
    *H04N 23/12*   (2023.01)
    *H04N 23/56*   (2023.01)
    *G01N 21/17*   (2006.01)
(52) U.S. Cl.
    CPC ............. *H04N 23/12* (2023.01); *H04N 23/56*
         (2023.01); *G01N 2021/1776* (2013.01); *G01N
                                  2201/0686* (2013.01)
(58) Field of Classification Search
    CPC ...... H04N 23/12; H04N 23/56; H04N 25/134;
             H04N 23/21; H04N 23/45; H04N 23/54;
             G01J 3/462; G01J 3/36; G01J 3/10; G01J
                 3/108; G03B 2215/0571; G03B 11/00;
                                         G03B 15/05
    See application file for complete search history.

(56) References Cited

U.S. PATENT DOCUMENTS

| | | | |
|---|---|---|---|
| 12,209,969 B2 * | 1/2025 | Niedermeier | ...... G01N 21/9036 |
| 2009/0021739 A1 | 1/2009 | Tsujita et al. | |
| 2014/0168719 A1 * | 6/2014 | Miura | .................... G07D 7/187 |
| | | | 358/474 |

FOREIGN PATENT DOCUMENTS

| | | |
|---|---|---|
| JP | 2007-209206 A | 8/2007 |
| JP | 2008-188196 A | 8/2008 |
| JP | 2011-033641 A | 2/2011 |
| JP | 2015-092141 A | 5/2015 |
| JP | 2020-106504 A | 7/2020 |

* cited by examiner

Z Outline Image

Y Outline Image

X Outline Image

IMAGING DEVICE, INSPECTION DEVICE, AND IMAGING METHOD

TECHNICAL FIELD

The present invention relates to an imaging device, an inspection device, and an imaging method for imaging a subject.

BACKGROUND ART

Patent Literatures 1 to 3, for example, disclose imaging devices that obtain an image by capturing an image of light applied from a light source to a subject, such as a bottle, with a camera. Patent Literatures 1 to 3 also disclose inspection devices for inspecting an inspection target such as characters on the subject, defects (flaws), and labels based on an image of the subject captured with a camera.

When the subject is inspected, different types of inspection targets in the subject may be inspected. When different types of inspection targets are characters, defects (flaws), labels, and the like, these inspection targets may have different optical characteristics. Different types of inspection targets with different optical characteristics may be difficult to inspect with a common light source and a camera. In this case, the images that enable inspection of the subject need to be captured under different imaging conditions. This may require an imaging system including sets of different types of light sources and cameras.

CITATION LIST

Patent Literature

Patent Literature 1: Japanese Laid-Open Patent Publication No. 2015-92141
Patent Literature 2: Japanese Laid-Open Patent Publication No. 2011-33641
Patent Literature 3: Japanese Laid-Open Patent Publication No. 2007-209206

SUMMARY OF INVENTION

Technical Problem

However, when an imaging system including multiple sets of light sources and cameras uses more than one camera, these cameras should capture images at different times, and separate image processing is required for each image. This lengthens the time required to inspect multiple locations. Additionally, when images from different cameras are commonly processed, the difference in position of the subject in the images obtained with these cameras necessitates processing such as the correction of positions and angles of view. Furthermore, a mechanism for preventing interference between illumination beams from different light sources, or light emission control may also be required.

It is an objective of the present invention to provide an imaging device and an imaging method capable of capturing images of multiple locations with different optical characteristics of a subject at the same angle of view using a single camera and a simple configuration. Also, it is an objective of the present invention to provide an inspection device capable of performing inspection by photographing multiple locations with different optical characteristics of a subject with a camera using a simple configuration and simple processing.

Solution to Problem

The means for solving the problems and their advantages are described below.

An imaging device that solves the above problems includes: a camera including an image sensor including a spectral optical filter of N bands (where N is a natural number greater than or equal to 3) with different spectral transmittance characteristics, wherein the image sensor has sensitivity to a visible light range and a near-infrared range; M types of light sources (where M is a natural number that satisfies $2 \leq M \leq N$) with emission spectral characteristics of having respective peaks in mutually different wavelength ranges within the visible light range and the near-infrared range; an optical filter that is disposed on an optical path between the image sensor and a subject and configured to transmit light beams of the mutually different wavelength ranges from the M types of light sources; and a conversion unit configured to generate image signals of M bands each having spectral sensitivity to a corresponding one of the mutually different wavelength ranges by separating an imaging signal obtained by the image sensor when the subject is photographed with the camera and performing a matrix operation on the separated imaging signals of N bands. The M types of light sources are configured to individually illuminate imaging target areas at M locations of the subject, and a direction in which light is applied to the subject that determines whether an image of a corresponding one of the imaging target areas at M locations captured by the camera is formed by transmitted light or reflected light and an emission intensity are individually selected for each of the imaging target area.

With this configuration, the image signals of M bands, which are obtained by a matrix operation from imaging signals of N bands, can generate M captured images each having spectral sensitivity to one of independent wavelength ranges. Thus, when light beams of emission spectra having respective peaks in mutually different wavelength ranges are individually applied from the M types of light sources to the imaging target areas at M locations with different optical characteristics of the subject from selected light application directions to photograph the imaging target areas at M locations, the illumination intensities of the M types of light sources for the imaging target areas at M locations can be individually set. As a result, in each of the M captured images obtained when the imaging target areas at M locations of the subject are simultaneously photographed at the same angle of view with a single camera, one of the M locations of the subject is more clearly captured than the other locations. Thus, images of multiple locations with different optical characteristics of the subject can be simultaneously captured at the same angle of view using a single camera and a simple configuration.

In the imaging device described above, the camera may be a general-purpose color camera from which an infrared cut-off filter has been removed.

This configuration uses a general-purpose color camera as the camera and thus simplifies the configuration of the imaging device.

In the above imaging device, the M types of light sources may include two types of light sources having emission spectral characteristics of having respective peaks in two different types of wavelength ranges within the visible light range. The image signals of M bands may be image signals of three or more bands and include a first image signal having spectral sensitivity to a first wavelength range that is one of the two types of wavelength ranges, a second image signal having spectral sensitivity to a second wavelength range that is the other of the two wavelength ranges, and a third image signal having spectral sensitivity to a third wavelength range different from both the first wavelength range and the second wavelength range.

With this configuration, image signals of three or more bands that capture multiple locations with different optical characteristics of the subject can be obtained by photographing the subject in one shot.

In the above imaging device, the M types of light sources may include a light source having an emission spectral characteristic in a predetermined wavelength range within the near-infrared range, and the image signals of M bands may include an image signal having spectral sensitivity to the predetermined wavelength range within the near-infrared range.

With this configuration, image signals of M bands including an image signal of a location of the subject that can be photographed with near-infrared light are obtained by photographing the subject in one shot.

In the above imaging device, the subject to be photographed with the camera may include an area with optical transparency, the M types of light sources may apply the M types of light beams at times including a period during which the light beams are simultaneously applied to the imaging target areas at M locations of the subject, and the camera may be configured to photograph the subject in one shot.

With this configuration, images of multiple locations with different optical characteristics of the subject can be photographed in one shot using a single camera and a simple configuration.

In the above imaging device, the M types of light sources may include at least two of a first light source disposed at a position on the opposite side of the subject from the camera, a second light source disposed at a position on the same side of the subject as the camera, or a third light source disposed at a position on the opposite side of the subject from the camera, the camera may be configured to capture at least two of a first image of transmitted light emitted from the first light source and transmitted through the subject, a second image of reflected light emitted from the second light source and reflected on the subject, or a third image of transmitted light emitted from the third light source and transmitted through the subject.

This configuration can capture at least two of the first image of transmitted light emitted from the first light source and transmitted through the subject, the second image of reflected light emitted from the second light source and reflected on the subject, and the third image of transmitted light emitted from the third light source and transmitted through the subject. This allows images of at least two locations with different optical characteristics of the subject to be effectively obtained.

An inspection device that solves the above problems includes the above imaging device and an inspection processing unit configured to inspect the subject based on the image signals of M bands output from the imaging device.

With this configuration, images of multiple locations with different optical characteristics of the subject can be photographed at the same angle of view using a single camera and the imaging device of a simple configuration. Thus, when multiple locations with different optical characteristics of the subject are photographed, the light intensity of each of the M types of light sources can be adjusted as appropriate without the need for significant consideration given to the influence of light on other imaging target areas. This allows multiple locations with different optical characteristics of the subject to be inspected with a simple process.

In the above inspection device, the subject may be a container containing liquid and including an area with optical transparency, the inspection processing unit may be configured to inspect characters on the outer surface of the container, and the inspection device may be configured to perform at least two of inspection of the characters on an area of the container that overlaps with the liquid, inspection of the characters on an area of the container that does not overlap with the liquid, or inspection of characters on a label affixed to the outer surface of the container.

According to this configuration, images of multiple locations with different optical characteristics of the subject can be suitably inspected with a simple configuration.

An imaging method that solves the above problems is an imaging method for photographing a subject with a camera and generating an image signal, the method including: a light application step of applying light to the subject with M types of light sources (where M is a natural number that satisfies 2≤M≤N) having emission spectral characteristics of having respective peaks in mutually different wavelength ranges within a visible light range and a near-infrared range; a photographing step of photographing imaging target areas at M locations of the subject through an optical filter configured to transmit light beams of the mutually different wavelength ranges from the M types of light sources and with the camera including an image sensor including a spectral optical filter of N bands (where N is a natural number greater than or equal to 3) with different spectral transmittance characteristics, wherein the image sensor has sensitivity to the visible light range and the near-infrared range; and a conversion step of generating image signals of M bands each having spectral sensitivity to a corresponding one of the mutually different wavelength ranges by separating an imaging signal captured by the image sensor into imaging signals of N bands and performing a matrix operation on the separated imaging signals of N bands. The M types of light sources individually illuminate imaging target areas at M locations of the subject, and a direction in which light is applied to the subject that determines whether an image of a corresponding one of the imaging target areas at M locations captured by the camera is formed by transmitted light or reflected light and an emission intensity are individually selected for each of the imaging target areas. This method has the same advantageous effects as the imaging device.

Advantageous Effects of Invention

According to the present invention, the light application intensity can be individually set for each of multiple imaging target areas with different optical characteristics of the subject. This allows images of imaging target areas to be simultaneously captured at the same angle of view using a single camera and a simple configuration.

DESCRIPTION OF EMBODIMENTS

First Embodiment

Figure 1:
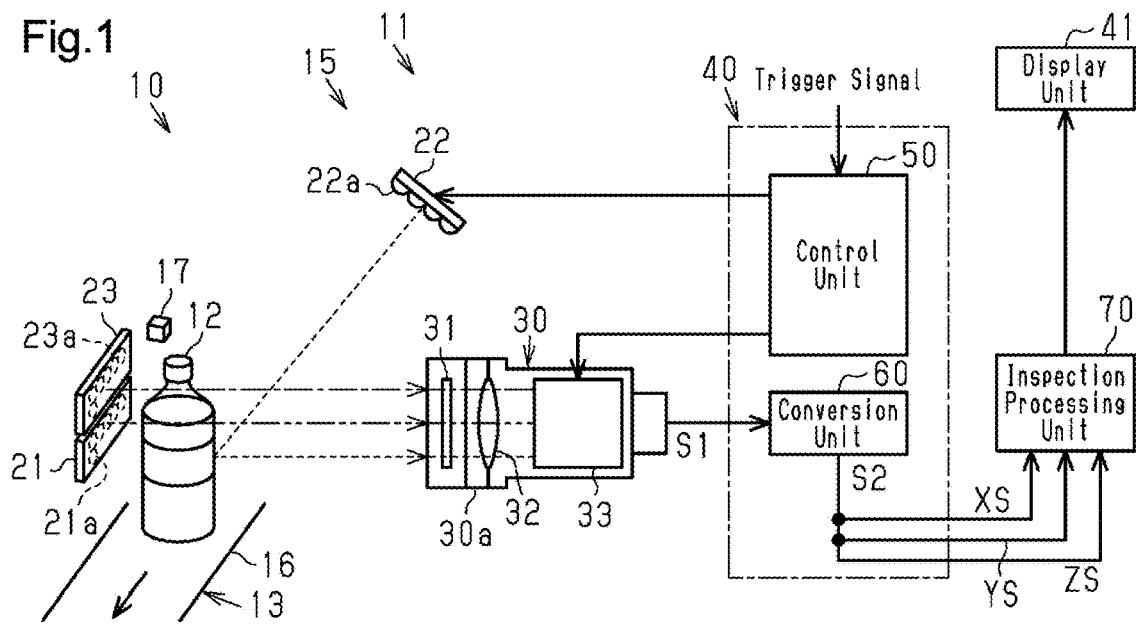
FIG. 1 is a schematic diagram showing an inspection system including an inspection device according to a first embodiment.

Referring to the drawings, an inspection system including an imaging device is now described.

An inspection system 10 shown in FIG. 1 inspects the quality of an article 12, which is an example of a subject, using captured images of the article 12. The inspection system 10 includes a conveying apparatus 13, which conveys articles 12, and an inspection device 11, which inspects the quality of each article 12 based on the imaging result (imaging signal) obtained by photographing the article 12 being conveyed by the conveying apparatus 13 with the camera 30. The inspection device 11 includes an imaging device 15, which generates multiband images including images (image signals) of M bands (where M is a natural number that satisfies 2≤M≤N) based on an N-band imaging signal (where N is a natural number greater than or equal to 3) output from the camera 30 after photographing an article 12. The inspection device 11 also includes an inspection processing unit 70, which performs inspection using the multiband images. The multiband images as used herein refer to M captured images obtained based on image signals of M bands.

The imaging device 15 includes M types (where 2≤M≤N) (for example, three types) of light sources 21 to 23, which apply light to the article 12, a camera 30, which photographs the article 12, and a control processing unit 40, which is electrically connected to the camera 30. At least a portion of the control processing unit 40 is configured by a computer. The computer includes an input device and a display unit. In this embodiment, the conveying apparatus 13 is driven by a control unit of a conveying system, which is connected to and communicates with the control system of the inspection device 11. The conveying apparatus 13 may be controlled by the control processing unit 40.

As shown in FIG. 1, the conveying apparatus 13 includes a conveyor 16, which conveys articles 12, a sensor 17, which detects articles 12 conveyed by the conveyor 16, and a removal device (not shown), which removes an article 12 that is determined to be defective based on the inspection result of the inspection device 11 from the moving line of non-defective products. The conveyor 16 may be a belt conveyor, a roller conveyor, a conveyor that conveys articles 12 by gripping them, or a conveyor that conveys suspended articles 12. The removal device may be configured to push out an article 12 to remove it, or to remove an article 12 by blowing it off with the force of air.

The inspection device 11 includes the imaging device 15, which generates images of multiple bands, the inspection processing unit 70, which inspects the quality of the article 12 using the images of multiple bands, and a display unit 41, which displays multiband images and the inspection result. The inspection device 11 inspects the article 12 based on images XI, YI, and ZI obtained by performing signal processing on a second imaging signal S2 of multiple bands, which is output when the imaging device 15 photographs the article 12 of the inspection target. The display unit 41 may be a monitor connected to the computer or a display provided on a control panel.

The imaging device 15 includes three types of light sources 21 to 23, which apply light to the article 12, the camera 30, which photographs the article 12, and the control processing unit 40. The three types of light sources 21 to 23 apply light to the article 12 from different predetermined directions and also to different areas of the article 12. That is, the three types of light sources 21 to 23 apply light to mutually different locations of the article 12 and in mutually different directions.

Figure 8A:
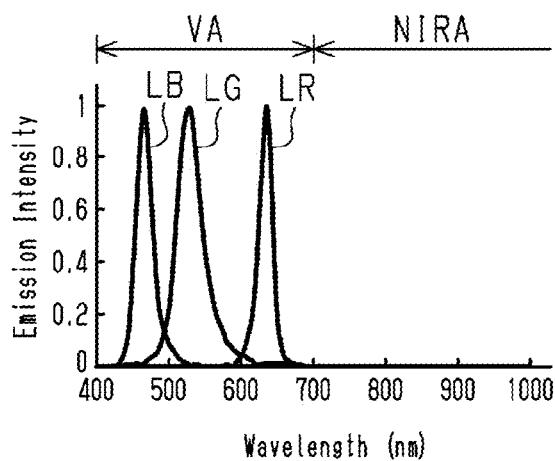
FIG. 8A is a graph showing the emission spectrum of a combination of three types of light sources.

The three types of light sources 21 to 23 of this embodiment include a first light source 21, a second light source 22, and a third light source 23, which apply light to different areas of the article 12 from different positions to simultaneously photograph different locations with different optical characteristics of the article 12 in one shot. The three types of light sources 21 to 23 satisfy the following two characteristic criteria as optical sources: (a) the overlapping portions (areas) of the emission characteristics of the three types of light sources 21 to 23 are sufficiently small as shown in FIG. 8A; and (b) the three types of light sources 21 to 23 have emission characteristics in the visible light range.

The three types of light sources 21 to 23 shown in FIG. 1 have mutually different emission spectral characteristics in the visible light range. The three types of light sources 21 to 23 include respective light emitting units 21a, 22a, and 23a with different emission spectral characteristics in a visible light wavelength range VA. The first light source 21 of this example includes a first light emitting unit 21a, which emits red light. The second light source 22 includes a second light emitting unit 22a, which emits green light. The third light source 23 includes a third light emitting unit 23a, which emits blue light. Each light emitting unit 21a, 22a, 23a may be an LED, for example. In this example, the first light emitting unit 21a is a red LED, the second light emitting unit 22a is a green LED, and the third light emitting unit 23a is a blue LED. That is, the first light source 21 is a red light source that emits red light having an emission spectrum in the red wavelength range (hereinafter also referred to as R light). The second light source 22 is a green light source that emits green light having an emission spectrum in the green wavelength range (hereinafter also referred to as G light). The third light source 23 is a blue light source that emits blue light having an emission spectrum in the blue wavelength range (hereinafter also referred to as B light).

Figure 2:
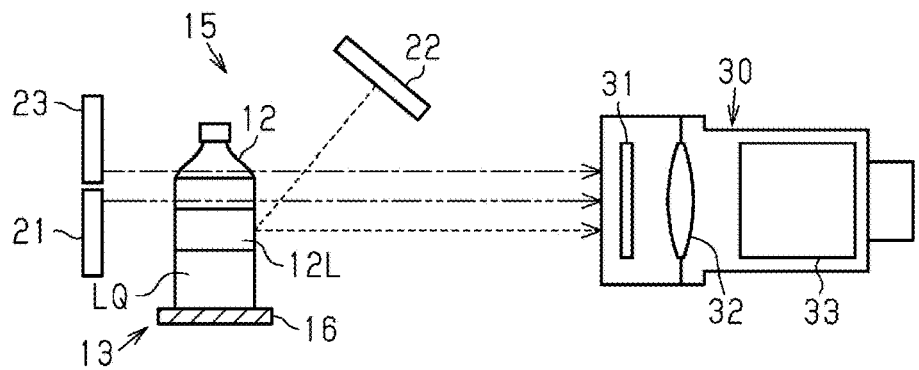
FIG. 2 is a schematic diagram showing the configuration of an imaging device.

As shown in FIGS. 1 and 2, the first light source 21 is disposed at a position on the opposite side of the article 12 from the camera 30. The second light source 22 is disposed at a position on the same side of the article 12 as the camera 30. The third light source 23 is disposed at a position on the opposite side of the article 12 from the camera 30. The M types of light sources 21 to 23 have the emission spectral characteristics of having respective peaks in different M types of wavelength ranges in the visible light range.

As shown in FIGS. 1 and 2, the camera 30 includes an optical bandpass filter 31, which is an example of an optical filter, a lens 32, and a color image sensor 33 (hereinafter simply referred to as image sensor 33). The optical bandpass filter 31 is disposed on the optical path between the article 12 and the image sensor 33. In the example shown in FIG. 1, the optical bandpass filter 31 is disposed between the article 12 and the lens 32, but it may also be disposed between the lens 32 and the image sensor 33.

The image sensor 33 receives light of an image of the article 12 through the optical bandpass filter 31 and the lens 32, and outputs a first imaging signal S1 according to the result of light reception. The first imaging signal S1 output by the image sensor 33 is input to the conversion unit 60. The conversion unit 60 converts the first imaging signal S1 into a second imaging signal S2 representing images of multiple bands.

The control processing unit 40 includes a control unit 50, which controls the M types of light sources 21 to 23 and the camera 30, and the conversion unit 60, which converts imaging signal of multiple bands, which are based on the imaging signal from the camera 30, into images of multiple bands.

The control unit 50 controls the light emission of the three types of light sources 21 to 23. Upon receiving an input of a trigger signal, which is a detection signal from the sensor 17 detecting an article 12 being conveyed by the conveyor 16, the control unit 50 causes the three types of light sources 21 to 23 to simultaneously emit light. In this manner, the three types of light sources 21 to 23 simultaneously apply light to the article 12 reaching the inspection position shown in FIGS. 1 and 2. Accordingly, R light, G light, and B light are applied to different inspection target areas of the article 12 from the three types of light sources 21 to 23. Also, in response to the trigger signal, the control unit 50 outputs an imaging command signal to cause the camera 30 to photograph the article 12 in one shot. As a result, the camera 30 photographs the article 12 in one shot with light beams of different types applied from the three types of light sources 21 to 23 to different areas of the article 12. It should be noted that instead of controlling the light emission of the three types of light sources 21 to 23, the control unit 50 may cause the light to be always on.

The article 12 photographed by the camera 30 includes areas with optical transparency. The M types of light sources 21 to 23 apply M types of light beams at times including a period during which the light beams are simultaneously applied to the different areas of the article 12. The camera 30 photographs the article 12 in one shot.

The conversion unit 60 converts the first imaging signal S1 obtained through the photographing with the camera 30 into a second imaging signal S2 representing images of multiple bands. In this example, the second imaging signal S2 is a signal representing images of three bands. The second imaging signal S2 includes a first image signal XS, a second image signal YS, and a third image signal ZS, which form three bands.

The conversion unit 60 separates the imaging signal output from the image sensor 33 into signals of N bands (where N is a natural number greater than or equal to 3) and performs a matrix operation on the separated imaging signals of N bands to generate three bands of a first image signal XS, a second image signal YS, and a third image signal ZS having spectral sensitivity to the visible light range.

The inspection processing unit 70 receives the first image signal XS, the second image signal YS, and the third image signal ZS. The inspection processing unit 70 inspects the quality of the article 12 based on the first image signal XS, the second image signal YS, and the third image signal ZS. The inspection processing unit 70 displays an X image XI based on the first image signal XS, a Y image YI based on the second image signal YS, and a Z image ZI based on the third image signal ZS on the display unit 41 as imaging results. The display unit 41 also displays the inspection result of the inspection on the quality of the article 12 based on the images XI, YI, and ZI of three channels. Any defect detected in the inspection process may be highlighted in the X image XI, Y image YI, and Z image ZI displayed on the display unit 41, such as by superimposing a mark on the defect or coloring the defect. In this embodiment, the inspection target is characters on the outer surface of the article 12. The inspection is conducted for defects such as distorted characters, fading, smear, and missing dots.

The inspection processing unit 70 shown in FIG. 1 inspects the quality of the article 12 based on the image signals XS, YS, and ZS of N bands generated by the conversion unit 60. The inspection processing unit 70 inspects the article 12 using visible light images of three channels captured simultaneously with the single camera 30 for one article 12. Since the visible light images of three channels are captured simultaneously with the single camera 30, the imaging timing and the angle of view are the same. To efficiently perform the processes of the conversion unit 60 and the inspection processing unit 70, the conversion unit 60 and the inspection processing unit 70 may be combined, and the process may be performed so as not to output image signals of XS, YS, and ZS of N bands.

As described above, the imaging device 15 includes the M types (for example, three types) of light sources 21 to 23, the camera 30, and the conversion unit 60 as main components.

The camera 30 includes a color filter 34, which is an example of a spectral optical filter, and an image sensor 33, which has sensitivity to a visible light range and a near-infrared range. The color filter 34 is a spectral optical filter of N bands (where N is a natural number greater than or equal to 3) having different spectral transmittance characteristics. In this embodiment, N=3, and the color filter 34 is a spectral optical filter with three bands of different spectral transmittance characteristics.

The imaging device 15 includes M types of light sources (where M is a natural number that satisfies $2 \leq M \leq N$). In this embodiment, M=3, and the imaging device 15 includes three types of light sources 21 to 23. The three types of light sources 21 to 23 have the emission spectral characteristics of having respective peaks in M different types of wavelength ranges within the visible light range.

The imaging device 15 also includes the conversion unit 60, which takes an input of an imaging signal obtained by the image sensor 33 when the camera 30 photographs the article 12, and converts this imaging signal. The conversion unit 60 to which the imaging signal S1 is input from the image sensor 33 separates the imaging signal S1 into imaging signals of N bands and generates image signals of M bands from the imaging signals of N bands. The conversion unit 60 performs a matrix operation on the imaging signals of N bands, which are obtained by separating the imaging signal S1, to generate image signals of M bands having spectral sensitivity to different M types of wavelength ranges. The image signals of M bands are image signals of three or more bands and include a first image signal, which has spectral sensitivity to a first wavelength range that is one of two types of wavelength ranges, a second image signal, which has spectral sensitivity to a second wavelength range of the other type, and a third image signal, which ha spectral sensitivity to a third wavelength range different from both the first and second wavelength ranges.

Figure 3:
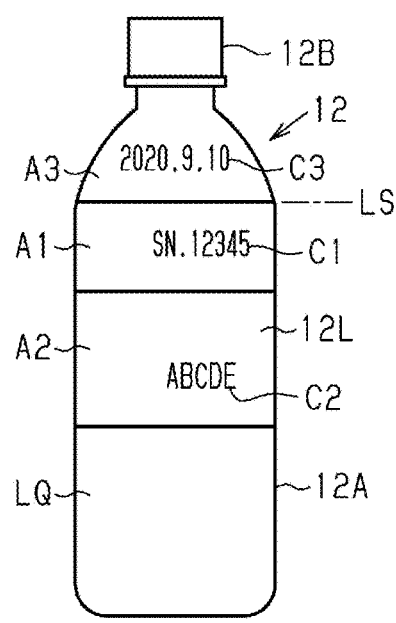
FIG. 3 is a schematic side view showing an article.

Referring to FIG. 3, the article 12 to be inspected is now described.

As shown in FIG. 3, the article 12 may be a container 12A, for example. The container 12A is made of a material with optical transparency. The material of the container 12A may be synthetic resin (plastic) or glass, for example. The article 12 may be colorless and transparent, or colored and transparent or translucent. For example, the article 12 may be a container 12A containing liquid LQ. The article 12 includes the container 12A, which contains the liquid LQ, and a cap 12B, which seals the opening of the container 12A. The article 12 may also include a label 12L affixed to the outer surface of the container 12A. For example, the label 12L may include a base of transparent colorless film and a print layer in which characters and patterns are printed on the surface of the film. The film, or the base, of the label 12L is affixed to the outer surface of the container 12A by thermal welding, thermal shrinkage, or an adhesive. The label 12L may also be made of paper that does not transmit visible light, and may be affixed to the surface of the container 12A with glue. The label 12L of the example of FIG. 3 is cylindrical and extends over the entire circumference of the container 12A, but the label 12L may extend partly in the circumferential direction.

As shown in FIG. 3, the container 12A has characters on its outer surface. The characters on the container 12A include first characters C1 in a first area A1 of the container 12A, which is below the liquid level LS, second characters C2 in a second area A2, which is an area of the label 12L affixed to the outer surface of the container 12A, and third characters C3 in a third area A3 of the container 12A, which is above the liquid level LS.

The first and third characters C1 and C3 are printed on the outer surface of the article 12 with ink, for example. The first and third characters C1 and C3 are characters of production-related information concerning the production of the article, such as the product name, serial number, production lot number, production location, production year, production month, production date, production time, and the like of the article 12. The second characters C2 are printed on the label 12L with ink. The second characters C2 are also characters of production-related information of the article 12, but printed on the label 12L instead of the container 12A. The second characters C2 may include characters originally printed on the label 12L. The label 12L may include printed characters of product-related information, such as barcode, two-dimensional code, trade name, content (liquid) components, volume, weight, storage method, note of caution, manufacturer address, and customer contact information. The second characters C2 may include characters of product-related information. The characters may be in any language such as Japanese, English, and Chinese. The characters may include kanji, Latin-script letters, hiragana, katakana, numerals, symbols, and codes.

The inspection target is not limited to characters, and may be defects in either the container or the label. The defect as used herein may refer to foreign matter mixed into the container, a scratch, a spike-like projection, an air bubble (void), or the like. Also, when the article 12 is a container, the inspection position is not limited to the container and label, and may be the cap. For example, characters of production-related information indicated on the cap may be inspected, or the cap itself may be inspected for defects. The areas A1 to A3 are light application areas to which light from the three light sources 21 to 23 is separately applied, and are also imaging target areas of the camera 30. When the inspection target is characters, a small area including each of the characters C1 to C3 in the areas A1 to A3 may be a light application area of the corresponding one of the light sources 21 to 23 and an imaging target area.

In the present embodiment, the article 12 includes M locations with different optical characteristics, which are the areas A1 to A3 of M types (three in this example). In this example, the first area A1, where the light from the light source 21 is transmitted through the container 12A and the liquid LQ, the second area A2, where the light from the light source 22 is reflected on the surface of the label 12L, and the third area A3, where the light from the light source 23 is transmitted through the container 12A and the air, have different optical characteristics. The optical characteristics also vary depending on the condition of the subject, such as the material of the container 12A, the presence or absence of the liquid LQ, the composition of the liquid LQ, the presence or absence of the label 12L, and the material of the label 12L. Furthermore, the optical characteristics also vary depending on whether to capture an image of transmitted light transmitted through the subject, or to capture an image of reflected light reflected on the surface of the subject. The optical characteristics also vary depending on the material, thickness, and the like of the ink forming the characters C1 to C3.

The container 12A may have any configuration as long as it includes at least one area with optical transparency. The entire container may have optical transparency, or only a partial area of the container 12A may have optical transparency. The container 12A may include only one area with optical transparency, or different areas of the container 12A may have optical transparency. The liquid LQ may have or lack optical transparency. The lack of optical transparency refers to a light transmittance of less than 10%. The light transmittance as used herein is defined by the value of light transmittance of the liquid LQ contained in the area of the container 12A in which the inspection target is located.

The M types of light sources 21 to 23 shown in FIG. 1 individually apply light to the areas A1 to A3, which are examples of imaging target areas at M locations of the article 12. The direction and the emission intensity of the light applied to the article 12 are individually selected for each of the areas A1 to A3. The direction of light determines whether the image of each of the areas A1 to A3 at M locations captured by the camera 30 is formed by transmitted light or reflected light. Additionally, the imaging device 15 shown in FIG. 1 includes the image sensor 33, which includes the color filter 34 (see FIG. 5) as an example of a spectral optical filter having N bands (where N is a natural number greater than or equal to 3) with different spectral transmittance characteristics in pixels. The image sensor 33 has sensitivity to the visible light range and the near-infrared range. The color filter 34 is configured by arranging R filters 34R, G filters 34G, and B filters 34B, which have different transmittance characteristics, in pixels.

The conversion unit 60 separates the first imaging signal S1 captured by the image sensor 33 into signals of N bands. Then, the conversion unit 60 performs a matrix operation on the separated image signals of N bands to obtain the first image signal XS, the second image signal YS, and the third image signal ZS of N bands (where N is a natural number greater than or equal to 3) having spectral sensitivity to a visible light range.

Figure 4A:
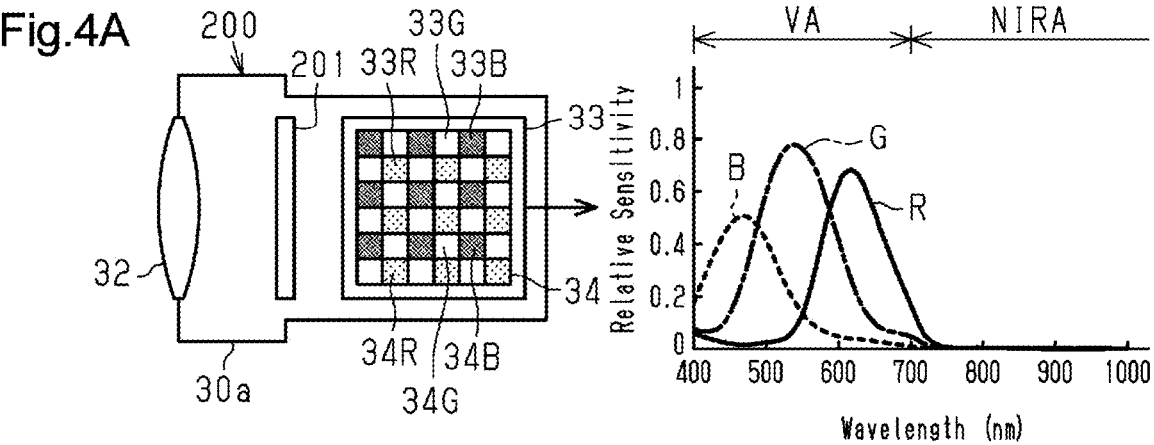
FIG. 4A is a configuration diagram of a general-purpose color camera and a graph showing the relationship between wavelength and relative sensitivity.
Figure 4B:
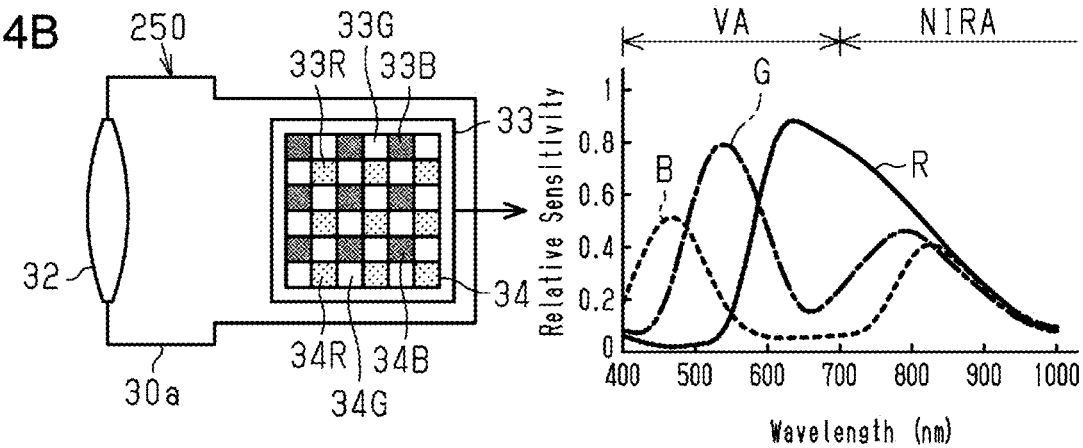
FIG. 4B is a configuration diagram of a color camera with an IR cut-off filter removed and a graph showing the relationship between wavelength and relative sensitivity.

Referring to FIGS. 4A and 4B, the configuration of the image sensor 33 of the camera 30 is now described. FIG. 4A shows a general-purpose color camera 200 for capturing RGB images. The color camera 200 includes a lens 32 attached to a lens barrel 30a, a near-infrared cut-off filter 201 for blocking near-infrared light (hereinafter also referred to as an IR cut-off filter 201), and the image sensor 33. The image sensor 33 includes an R light receiving element 33R, which receives red light transmitted through the R filter 34R and outputs an R imaging signal corresponding to the amount of received light, a G light receiving element 33G, which receives green light transmitted through the G filter 34G and outputs a G imaging signal corresponding to the amount of received light, and a B light receiving element 33B, which receives blue light transmitted through the B filter 34B and outputs a B imaging signal corresponding to the amount of received light. In the image sensor 33, the R light receiving elements 33R, the G light receiving elements 33G, and the B light receiving elements 33B are arranged in a predetermined arrangement.

This image sensor 33 has an RGB imaging characteristic in which near-infrared light is cut. The R light receiving elements 33R, the G light receiving elements 33G, and the B light receiving elements 33B have sensitivity to light of respective wavelength bands shown in the graph of FIG. 4A. In this graph, the horizontal axis indicates wavelength and the vertical axis indicates relative sensitivity. The R light receiving element 33R has high sensitivity to light of the red (R) wavelength band shown in the graph of FIG. 4A. The G light receiving element 33G has high sensitivity to light of the green (G) wavelength band shown in the graph of FIG. 4A. The B light receiving element 33B has high sensitivity to light of the blue (B) wavelength band shown in the graph of FIG. 4A.

FIG. 4B shows a color camera 250 obtained by removing the IR cut-off filter 201 from the general-purpose color camera 200 shown in FIG. 4A. Since near-infrared light is not blocked, the image sensor 33 embedded in the color camera 250 has an RGB imaging characteristic including the wavelength band of near-infrared light. The R, G, and B light receiving elements 33R, 33G, and 33B have sensitivity to light in the visible light wavelength range VA and the near-infrared wavelength range NIRA (particularly the near-infrared wavelength range) shown in the graph in FIG. 4B.

The image sensor 33 itself has sensitivity to the visible light wavelength range VA and the near-infrared wavelength range NIRA, as shown in the graph of FIG. 4B. The camera 30 is a general-purpose color camera from which an infrared cut-off filter has been removed. Specifically, the camera 30 may be configured by removing the IR cut-off filter 201 from the general-purpose color camera 200 shown in FIG. 4A and then placing an optical bandpass filter 31 on the optical path. The camera 30 is not limited to a configuration that is based on the general-purpose color camera 200.

The color filter 34 forming the image sensor 33 is an RGB primary color filter, but may be a complementary color filter of Mg, Ye, and Cy. Also, an NIR filter that selectively transmits near-infrared light may also be added to the RGB filter or the complementary color filter. Furthermore, the RGB filter may be an R, G1, G2, B filter, and the color filter 34 may be a combination of a complementary color filter and a primary color filter. Three or more types of filters may be combined.

Figure 5:
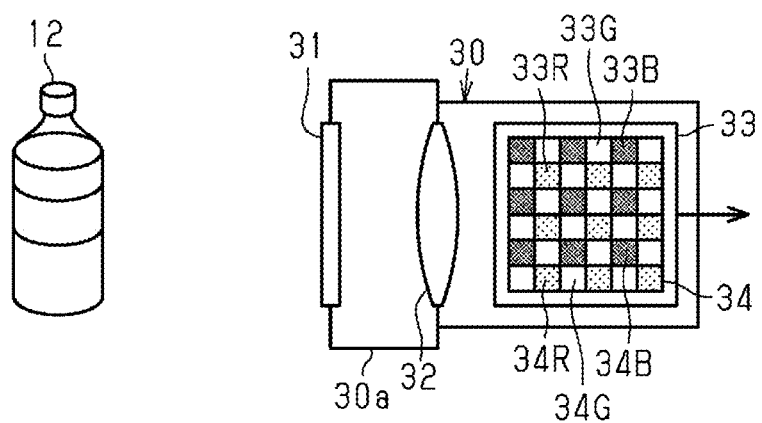
FIG. 5 is a schematic diagram showing the configuration of a camera.

FIG. 5 shows a schematic configuration of the camera 30 of this embodiment. As shown in FIG. 5, the camera 30 includes the optical bandpass filter 31 on the optical path between the image sensor 33 and the article 12. The camera 30 does not include the IR cut-off filter 201 shown in FIG. 4A. The image sensor 33 has the same configuration as the general-purpose color camera 200 shown in FIG. 4A.

Figure 8B:
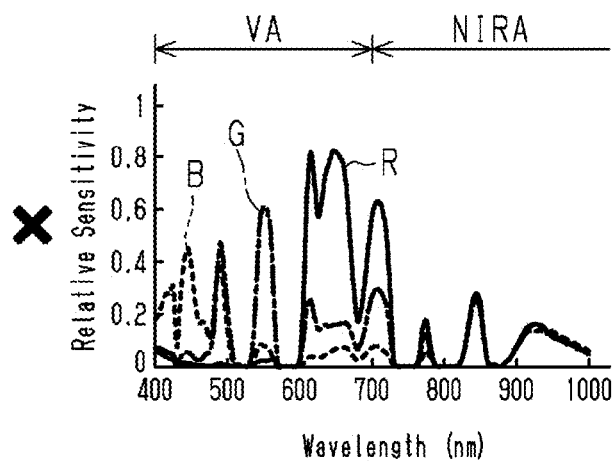
FIG. 8B is a graph showing the relative sensitivity to each color of the image sensor with the optical bandpass filter interposed.

The image sensor 33 in the camera 30 shown in FIG. 5 has the relative sensitivity characteristic shown in FIG. 8B. That is, the R light receiving elements 33R forming the image sensor 33 have sensitivity to the band indicated by R in the graph of FIG. 8B, the G light receiving elements 33G have sensitivity to the band indicated by G, and the B light receiving elements 33B have sensitivity to the band indicated by B. Of the light that has passed through the optical bandpass filter 31, the light receiving elements 33R, 33G, and 33B receive the light that has passed through the filters 34R, 34G, and 34B of the color filter 34 according to their respective sensitivity. The image sensor 33 generates a first imaging signal S1, in which imaging signals representing an R value, a G value, and a B value corresponding to the amounts of light received by the light receiving elements 33R, 33G, and 33B are serially arranged in the order of a predetermined arrangement pattern.

The optical bandpass filter 31 has the spectral transmittance characteristic of having one or more blocking ranges in the visible light wavelength range VA and one or more transmitting ranges in the near-infrared wavelength range NIRA. The optical bandpass filter 31 with this spectral transmittance characteristic is composed of one sheet, but it may be composed of multiple sheets. Nevertheless, an optical bandpass filter 31 composed of multiple sheets has a lower light transmittance and thus requires greater amounts of light from the light sources 21 to 23. As such, the optical bandpass filter 31 preferably includes a fewer number of sheets.

To accommodate the variations of spectral reflectance characteristics of the objects to be identified on the article 12 as the inspection target (for example, characters and defects), the optical bandpass filter 31 that has spectral transmittance characteristics suitable for inspection is used.

Figure 6A:
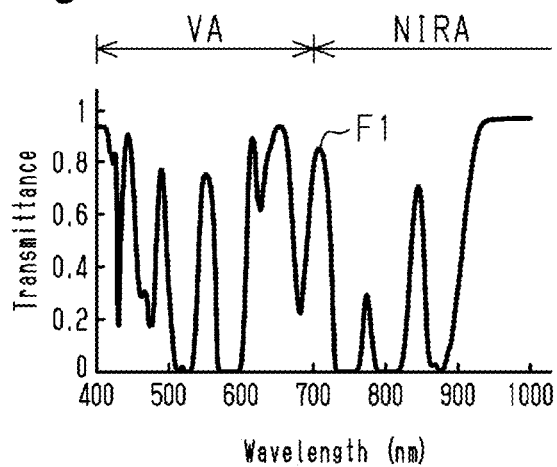
FIG. 6A is a graph showing the light transmittance characteristic of an optical bandpass filter.

The graph of FIG. 6A shows the transmission wavelength range of the optical bandpass filter 31. The graph of FIG. 6B shows the relative sensitivity characteristic of the image sensor 33 that is illuminated with an ideal light source having an emission spectrum in which the relative value is 1 in all wavelength ranges.

The transmittance characteristic curve F1 of the optical bandpass filter 31 shown in FIG. 6A has multiple peaks in the transmission wavelength range. It has the spectral transmittance characteristic of having blocking ranges with a transmittance of 10% or less in multiple wavelength bands and having transmitting ranges with a transmittance of 70% or more in multiple wavelength bands. The optical bandpass filter 31 has the spectral transmittance characteristic of having one or more blocking ranges in the visible light wavelength range VA and having transmitting ranges in the near-infrared wavelength range NIRA.

As can be seen from the transmittance characteristic curve F1 shown in the graph of FIG. 6A, the optical bandpass filter 31 has peaks in multiple transmission wavelength ranges between about 400 and 510 nm, a peak in one transmission wavelength range between about 530 and 570 nm, and peaks in multiple transmission wavelength ranges between about 600 to 730 nm in the visible light wavelength range VA. In the near-infrared wavelength range NIRA, the optical bandpass filter 31 has a transmission wavelength range between about 820 and 870 nm and a wavelength range of about 880 nm or more.

Figure 6B:
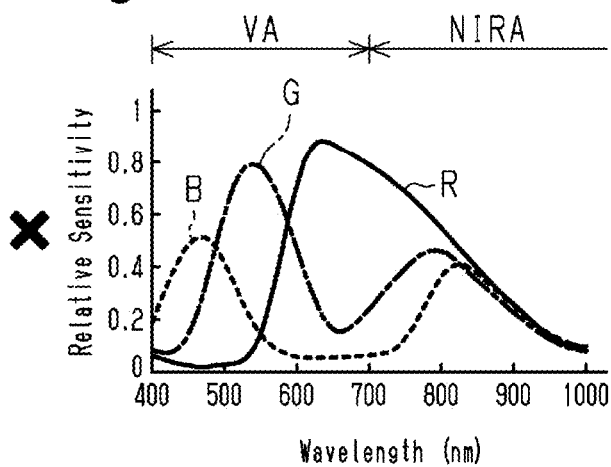
FIG. 6B is a graph showing the relative sensitivity to each color of an image sensor.

Thus, although the image sensor 33 itself has relative sensitivity to the three bands of RGB as shown in FIG. 6B, the spectral transmittance characteristic of the optical bandpass filter 31 shown in FIG. 6A causes the image sensor 33 shown in FIG. 5 to substantially have relative sensitivity shown in the graph of FIG. 8B.

When light is applied from an ideal light source having an emission spectrum in which the relative value is 1 in all wavelength ranges, the image sensor 33, which has the relative sensitivity shown in FIG. 6B, receives the light that is transmitted through the transmission wavelength ranges of the optical bandpass filter 31, which are shown in FIG. 6A. Accordingly, the R, G, and B signals of the image sensor 33 in the camera 30 of FIG. 5 have relative sensitivity shown in the graph of FIG. 8B. The transmission wavelength ranges of the optical bandpass filter 31 shown in FIG. 6A and the relative sensitivity of the image sensor 33 shown in FIG. 6B determine the relative sensitivity of the image sensor 33 to the light transmitted through the optical bandpass filter 31 as shown in FIG. 8B.

Figure 7A:
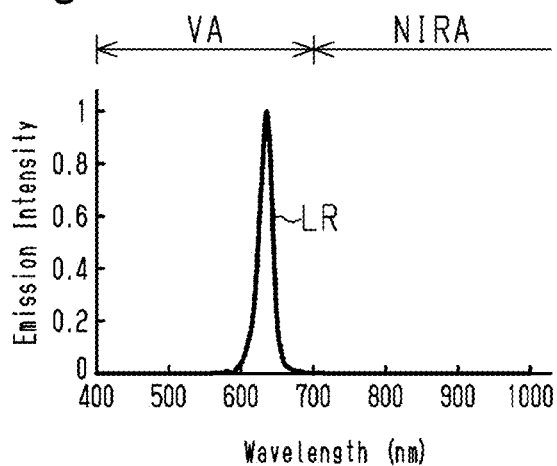
FIGS. 7A to 7C are graphs showing emission spectra of three types of light sources.
Figure 7B:
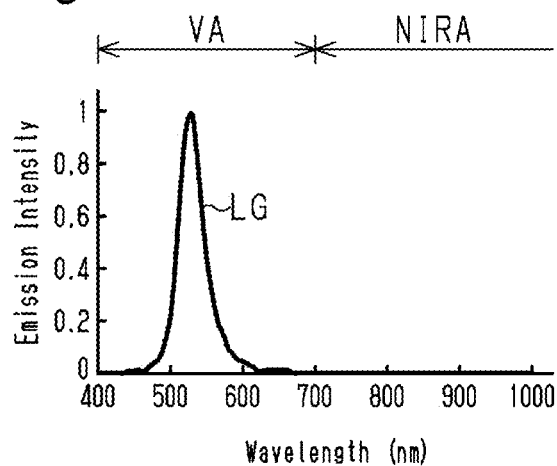
Figure 7C:
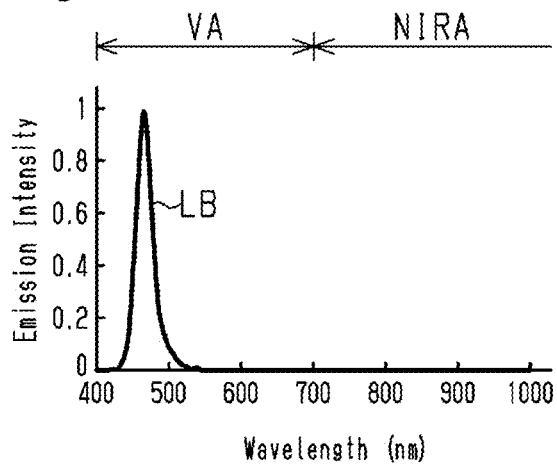

FIGS. 7A to 7C show the emission spectra of the first light source 21, the second light source 22, and the third light source 23, receptively. FIG. 7A shows the emission spectrum LR of the first light source 21, FIG. 7B shows the emission spectrum LG of the second light source 22, and FIG. 7C shows the emission spectrum LB of the third light source 23. The emission spectrum LR of the first light source 21 shown in FIG. 7A has one peak between about 600 and 670 nm in the visible light wavelength range VA. The emission spectrum LG of the second light source 22 shown in FIG. 7B has one peak in a visible light wavelength range of about 470 to 620 nm. The emission spectrum LB of the third light source 23 shown in FIG. 7C has one peak in a visible light wavelength range of about 430 to 550 nm. The three emission spectra LR, LG, and LB slightly overlap in wavelength ranges with an emission intensity of 0.1 or less. However, in the ranges with an emission intensity greater than or equal to 0.2, their peaks are substantially independent and in different wavelength ranges.

FIG. 8A shows the emission spectra LR, LG, and LB of the combination of the first to third light sources 21 to 23. The emission spectra LR, LG, and LB have one peak in a visible light wavelength range of about 600 to 670 nm, one peak in a visible light wavelength range of about 470 to 620 nm, and one peak in a visible light wavelength range of about 430 to 550 nm.

As shown in FIG. 8A, the emission spectra LR, LG, and LB of the combination of the three types of light sources 21 to 23 have peaks overlapping with three transmission wavelength ranges in the visible light wavelength range VA of the multiple transmission wavelength ranges of the optical bandpass filter 31. That is, the emission spectrum LR of the first light source 21 has a peak in a visible light wavelength range of about 600 to 670 nm, the emission spectrum LG of the second light source 22 has a peak in a visible light wavelength range of about 470 to 620 nm, and the emission spectrum LB of the third light source 23 has a peak in a visible light wavelength range of about 430 to 550 nm.

Figure 9A:
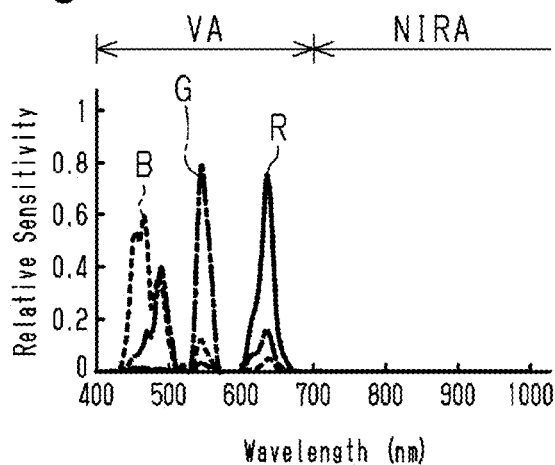
FIG. 9A is a graph showing the relative sensitivity to each color of an image sensor under a situation in which three types of light sources are used as light sources.
Figure 9B:
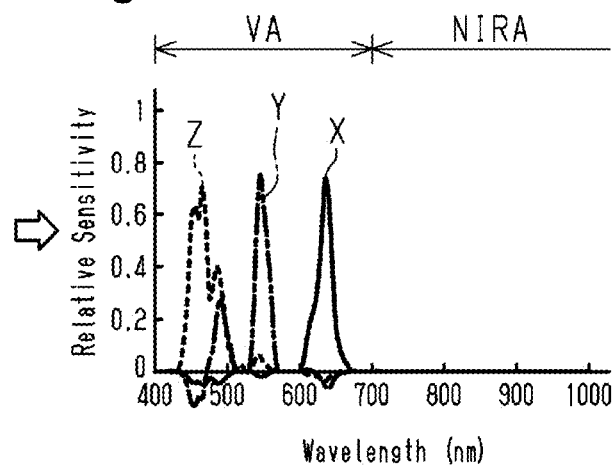
FIG. 9B is a graph showing the relative output characteristic of each band of a second imaging signal.

FIG. 9A shows the relative output characteristic of the image sensor 33 to which light is applied from the three types of light sources 21 to 23, which have emission spectral characteristics of having respective peaks in mutually different wavelength ranges over the entire wavelength range. FIG. 9B shows the relative output characteristics of an X signal, a Y signal, and a Z signal, which are output by the conversion unit 60. An R signal, a G signal, and a B signal having the relative sensitivity shown in FIG. 9A are input to and converted by the conversion unit 60 into the X, Y, and Z signals.

When light with the emission spectral characteristics of the combination of the three types of light sources 21 to 23 shown in FIG. 8A is incident, as the result of the combination of the emission intensity characteristics shown in FIG. 8A and the relative sensitivity characteristic of the first imaging signal S1 shown in FIG. 8B, the image sensor 33 outputs RGB signals of three bands as a first imaging signal S1 shown in the graph of FIG. 9A. The conversion unit 60 converts the RGB signals of three bands shown in the graph of FIG. 9A into XYZ signals of three bands shown in FIG. 9B having spectral sensitivity characteristics different from those of the RGB signals.

As shown in the graph of FIG. 9B, the X band has a peak between about 600 and 670 nm, the Y band has peaks between about 470 and 510 nm and between 530 and 570 nm, and the Z band has a peak between about 430 and 510 nm. Each of the peaks of sensitivity indicated by the three bands of XYZ is higher than the sensitivity of the other two bands in the corresponding wavelength range, and the bands of XYZ are separated. The three bands X, Y, and Z are bands of visible light that are separated from each other.

Figure 10:
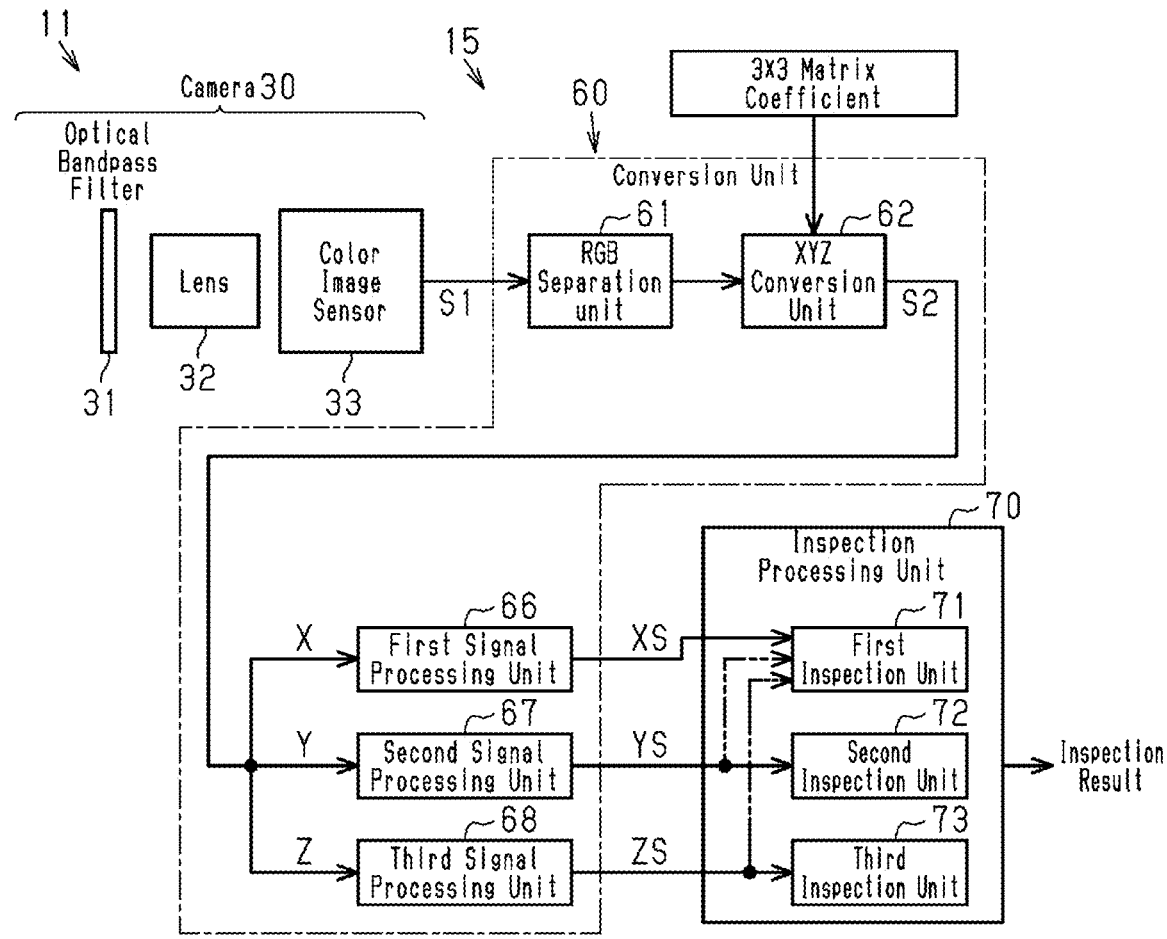
FIG. 10 is a block diagram showing the functional configuration of an inspection device.

Referring to FIG. 10, the configurations of the conversion unit 60 and the inspection processing unit 70 are now described in detail.

As shown in FIG. 10, an image of the article 12 is formed on the imaging surface of the image sensor 33 through the optical bandpass filter 31 and the lens 32. The image sensor 33 outputs a first imaging signal S1 to the conversion unit 60 as the imaging result of the article 12. The first imaging signal S1 is a serial signal including an R imaging signal (red signal), a G imaging signal (green signal), and a B imaging signal (blue signal) from the light receiving elements 33R, 33G, and 33B. The R imaging signal, the G imaging signal, and the B imaging signal are also simply referred to as R signal, G signal, and B signal.

As shown in FIG. 10, the conversion unit 60 includes an RGB separation unit 61 and an XYZ conversion unit 62. The RGB separation unit 61 separates the first imaging signal S1 input from the image sensor 33 into an R signal, a G signal, and a B signal.

The XYZ conversion unit 62 converts the R signal, G signal, and B signal input from the RGB separation unit 61 into an X signal, a Y signal, and a Z signal. Specifically, the XYZ conversion unit 62 converts the RGB values, which are the signal values of the R signal, the G signal, and the B signal, into the X signal, the Y signal, and the Z signal by performing a matrix operation. The XYZ conversion unit 62 is given matrix coefficients. The matrix used in this example for the matrix operation is a 3×3 matrix. Coefficients in a 3×3 matrix are given to the XYZ conversion unit 62.

The XYZ conversion unit 62 performs a matrix operation in which the RGB values of the first imaging signal S1 are multiplied by a 3×3 matrix specified by matrix coefficients, thereby converting the first imaging signal S1 into the second imaging signal S2, which is represented by XYZ differing from the RGB of the first imaging signal S1 in spectral characteristic. The matrix coefficients are coefficients for splitting the RGB of the first imaging signal S1 into the XYZ of the second imaging signal S2 of multiple bands.

The calculation formula for converting the RGB signal, which is the first imaging signal S1, into the XYZ signal, which is the second imaging signal S2, is given by the following expression (1).

$$\begin{pmatrix} X \\ Y \\ Z \end{pmatrix} = \begin{pmatrix} a1 & a2 & a3 \\ b1 & b2 & b3 \\ c1 & c2 & c3 \end{pmatrix} \times \begin{pmatrix} R \\ G \\ B \end{pmatrix} \quad (1)$$

In this expression, a1 to a3, b1 to b3, and c1 to c3 are matrix coefficients.

The XYZ conversion unit 62 performs the arithmetic processing of multiplying the RGB values by the 3×3 matrix as the above expression (1). The XYZ conversion unit 62 outputs the XYZ values, and then an amplification unit outputs amplified values.

When the number of colors of the color filter 34 of the image sensor 33 is n (where n is a natural number greater than or equal to 3), the matrix operation performed on n imaging signals is an m×n matrix operation (where m is a natural number greater than or equal to 2). The m×n matrix includes matrix coefficients that are set to separate the imaging signals for the respective colors in the first imaging signal S1 into wavelength ranges of n bands. In this example, the imaging signals for the respective colors in the first imaging signal S1 are the R signal, the G signal, and the B signal, and the number of colors n is 3 (n=3). The second imaging signal S2 includes the X signal, the Y signal, and the Z signal of three bands, and m=3. That is, the m×n matrix is a 3×3 matrix. The 3×3 matrix has matrix coefficients that are set to enhance the separation of the three bands.

For example, when the optical bandpass filter 31 having the transmittance characteristic indicated by the transmittance characteristic curve F1 in FIG. 6A is used, the following 3×3 matrix coefficients are given for the matrix operation for the conversion from FIG. 9A to FIG. 9B. That is, as shown in the calculation formula given by the following expression (2), a1=1, a2=−0.05, a3=−0.1, b1=−0.27, b2=1, b3=−0.35, c1=−0.1, c2=−0.1, and c3=1.2 are given as the coefficients of the 3×3 matrix, and the XYZ values are given by the following expression (2).

$$\begin{pmatrix} X \\ Y \\ Z \end{pmatrix} = \begin{pmatrix} 1 & -0.05 & -0.1 \\ -0.27 & 1 & -0.35 \\ -0.1 & -0.1 & 1.2 \end{pmatrix} \times \begin{pmatrix} R \\ G \\ B \end{pmatrix} \quad (2)$$

Also, an m×n matrix operation (where m n) may be used. When the number of colors is 3, the operation is not limited to the 3×3 matrix operation, and a 3×4 matrix operation may be performed to generate multiband images of four bands, or a 3×2 matrix operation may be performed to generate multiband images with a smaller number of bands than the number of colors n.

An amplifier (not shown) may be provided to multiply the XYZ values from the XYZ conversion unit 62 separately by an X amplification factor Gx, a Y amplification factor Gy, and a Z amplification factor Gz. The amplification unit may normalize the bands of XYZ given by the above expression (1). The normalization process may fix one signal level and adjust the other two signal levels. For example, the Y signal may be fixed, and the X and Z signals may be adjusted.

In this manner, the conversion unit 60 sequentially performs RGB separation processing, XYZ conversion processing, and the like on the input first imaging signal S1, thereby outputting the second imaging signal S2. The conversion unit 60 outputs to the inspection processing unit 70 the second imaging signal S2 representing multiband images of three bands in which the article 12 is captured. The first imaging signal S1 is composed of R, G, and B imaging signals of N bands. The second imaging signal S2 is composed of X, Y, and Z image signals of N bands. The conversion unit 60 converts the R, G, and B imaging signals of N bands into X, Y, and Z image signals of N bands. In this example, the R, G, and B imaging signals of three bands are converted into X, Y, and Z image signals of three bands. Multiband images of three bands are thus generated. From the first imaging signal S1, the conversion unit 60 generates a first image signal XS, a second image signal YS, and a third image signal ZS of N bands having spectral sensitivity to the visible light range.

A first signal processing unit 66 outputs the first image signal XS to the inspection processing unit 70. A second signal processing unit 67 outputs the second image signal YS to the inspection processing unit 70. A third signal processing unit 68 outputs the third image signal ZS to the inspection processing unit 70. These signal processing units 66 to 68 may adjust the brightness by performing non-linear processing such as gamma correction, or perform edge enhancement processing and the like, if necessary.

The inspection processing unit 70 is now described.

The inspection processing unit 70 inspects the article 12 based on the first image signal XS, the second image signal YS, and the third image signal ZS of N bands (for example, three bands) having spectral sensitivity to the visible light range output from the imaging device 15. The inspection processing unit 70 includes a first inspection unit 71, a second inspection unit 72, and a third inspection unit 73. The first inspection unit 71 inspects the first area A1 of the article 12 using an X image based on the first image signal XS. The second inspection unit 72 inspects the second area A2 of the article 12 using a Y image based on the second image signal YS. The third inspection unit 73 inspects the third area A3 of the article 12 using a Z image based on the third image signal ZS. For example, each of the inspection units 71 to 73 inspects the characters C1, C2, C3 in the corresponding inspection target area among the first, second, and third areas A1, A2, and A3 for character errors such as printing errors, smear, and missing dots. In this manner, the inspection processing unit 70 determines the quality of the article 12 based on the presence or absence of character errors.

Operation of the imaging device 15 and the inspection device 11 is now described.

As shown in FIG. 1, the conveyor 16 of the conveying apparatus 13 conveys articles 12. When the sensor 17 detects an article 12, a trigger signal is input to the control unit 50. Upon receiving the trigger signal, the control unit 50 outputs a light emission command signal to cause the three types of light sources 21 to 23 to emit light, and also outputs an imaging command signal to cause the image sensor 33 to perform imaging. At this time, the first light source 21 illuminates the first area A1, which is below the liquid level LS, of the container 12A with a light amount suitable for photographing the characters C1 in the first area A1 with transmitted light. The second light source 22 applies light to the characters C2 of the label 12L affixed to the container 12A from the front side to illuminate the second area A2 with a light amount suitable for capturing an image of the character C2 with reflected light. The third light source 23 illuminates the third area A3, which is above the liquid level LS, of the container 12A with a light amount suitable for photographing the characters C3 in the third area A3 with transmitted light.

Through the optical bandpass filter 31 and the lens 32, the camera 30 receives an image of red light transmitted through the first area A1 of the article 12, an image of reflected light reflected on the surface of the second area A2, which is in the label 12L on the article 12, and an image of blue light transmitted through the third area A3 of the article 12. The areas A1 to A3 are illuminated with amounts of light suitable for photographing the respective characters C1 to C3. For this reason, the image of the light transmitted through the first area A1 tends to include light of colors other than red light, the image of the light reflected on the second area A2 tends to include light of colors other than green light, and the image of the light transmitted through the third area A3 tends to include light of colors other than blue light. When the amount of light of one of the light sources 21 to 23 is large, a substantial amount of light is applied also to an area other than the target area, such as an adjacent area. Additionally, light of other colors may be included due to factors such as reflection, refraction, and scattering occurring while light of other colors passes through the article 12. The images of the areas A1, A2, and A3 of the article 12 are formed on the imaging surface of the image sensor 33 in the camera 30. The image sensor 33 captures images of the areas A1, A2, and A3 of the article 12 in one shot using the light transmitted through the optical bandpass filter 31. The image sensor 33 outputs the first imaging signal S1, which is the imaging result, to the conversion unit 60.

The conversion unit 60 separates the first imaging signal S1 into RGB, and multiplies the separated RGB values by a 3×3 matrix to convert the RGB values into XYZ values. For example, the signal processing units 66 to 68 perform predetermined signal processing including normalization that multiplies the XYZ values by amplification factors Gx, Gy, and Gz. From the RGB image signals forming the first imaging signal S1, the conversion unit 60 generates XYZ image signals forming the second imaging signal S2 of N bands having spectral sensitivity to the visible light range. Thus, the conversion unit 60 outputs to the inspection processing unit 70 the XYZ image signals (the first image signal XS, the second image signal YS, and the third image signal ZS) forming the second imaging signal S2 representing the multiband images of three bands. The output characteristics shown in FIGS. 9A and 9B allow an X image that is not influenced by G light or B light to be obtained based on the first image signal XS, and allow a Z image that is not influenced by R light or G light to be obtained based on the third image signal ZS. A Y image obtained based on the second image signal YS is not influenced by the R light, but is influenced by the B light. However, since the B light is applied from the back side of the article 12 and the G light is applied from the front side, the influence of the B light can be ignored.

In the inspection processing unit 70, the first inspection unit 71 inspects the article 12 based on the first image signal XS. The second inspection unit 72 inspects the article 12 based on the second image signal YS. The third inspection unit 73 inspects the article 12 based on the third image signal ZS, which is a visible light image.

Figure 11:
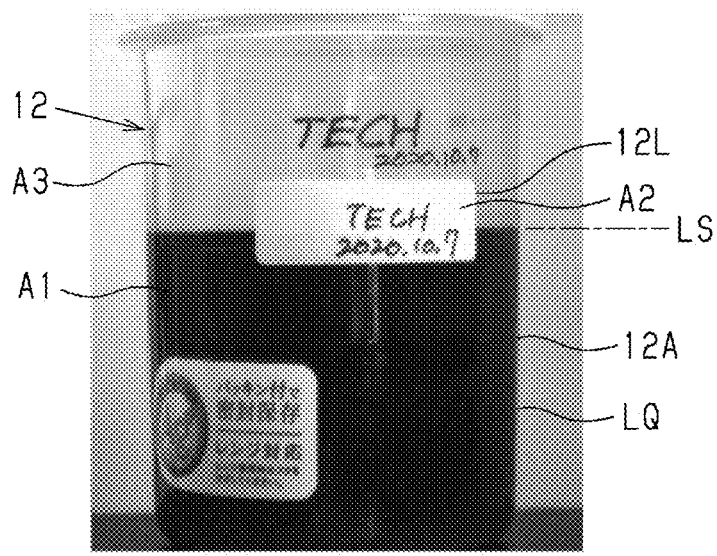
FIG. 11 is a diagram showing an image of an article captured with natural light.

An X image XI based on the first image signal XS, a Y image YI based on the second image signal YS, and a Z image ZI based on the third image signal ZS are now described. FIG. 11 is an image of the article 12 captured under natural light. The article 12 is a container 12A containing liquid LQ, and the inspection areas of the article are photographed with the imaging device. As shown in FIG. 11, a label 12L is affixed to the outer surface of the container 12A. On the outer surface of the container 12A, the first area A1 below the liquid level LS, the third area A3 above the liquid level LS, and the label 12L each have characters. This article 12 is photographed with the imaging device 15.

Figure 12A:
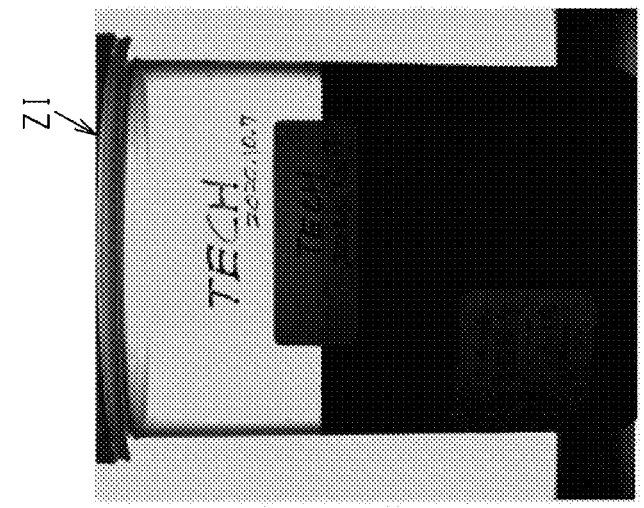
FIGS. 12A to 12C are diagrams showing an X image, a Y image, and a Z image, respectively.
Figure 12B:
Figure 12C:
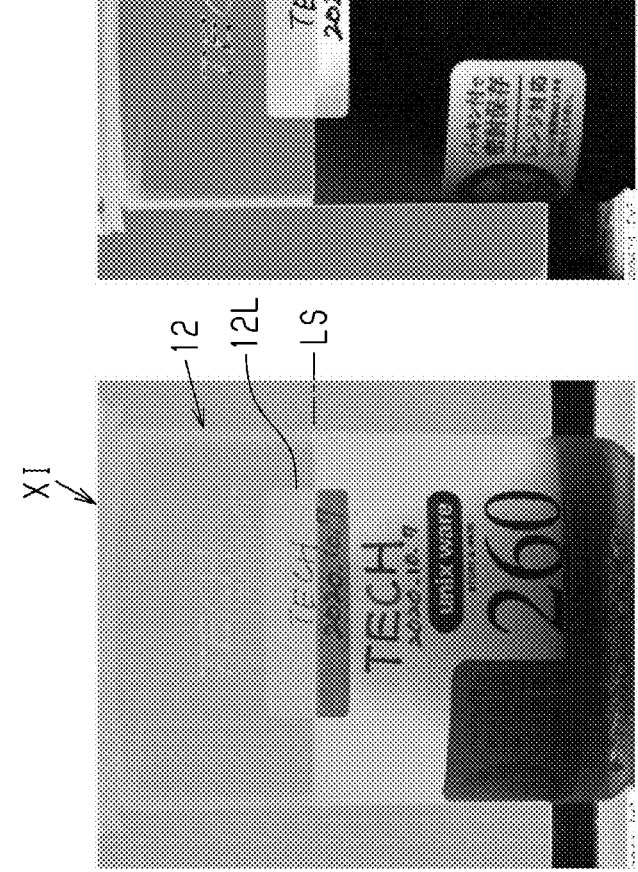

FIGS. 12A to 12C show an X image XI, a Y image YI, and a Z image ZI, respectively, obtained as imaging results when the imaging device 15 photographs the article 12 shown in FIG. 11.

The X image XI shown in FIG. 12A is an image based on the first image signal XS. In the X image XI, the characters in the first area A1, which is below the liquid level LS and overlaps with the liquid, of the article 12 are clearly captured. In this example, the light transmittance of the characters printed on the container 12A is lower in the visible light range and higher in the infrared range. In contrast, the light transmittance of the liquid, which is the content of the container 12A, is lower in the blue and green ranges, and increases with the wavelength in the red range and above. As such, in the red range, the characters and liquid differ in transmittance, facilitating the recognition of characters.

The Y image YI shown in FIG. 12B is an image based on the second image signal YS. The Y image YI based on the second image signal YS is not influenced by the R light, but is influenced by the B light. However, since the B light is applied from the back side of the article 12 and the G light is applied from the front side, the influence of the B light can be ignored. Thus, the characters in the second area A2 of the label 12L are clearly captured in the Y image YI.

The Z image ZI shown in FIG. 12C is an image based on the third image signal ZS. The Z image ZI based on the third image signal ZS is not influenced by the R light or the G light. That is, the image is not influenced by the R light, which tends to render the characters translucent, and the reflected light of the G light applied from the front side and reflected on the surface of the container (reflection) does not interfere with the identification of characters. As a result, in the Z image ZI, the characters in the third area A3, which does not overlap with the liquid, are clearly captured. The display unit 41 displays the images XI, YI, and ZI of FIGS. 12A to 12C obtained in the inspection.

Figure 13C:
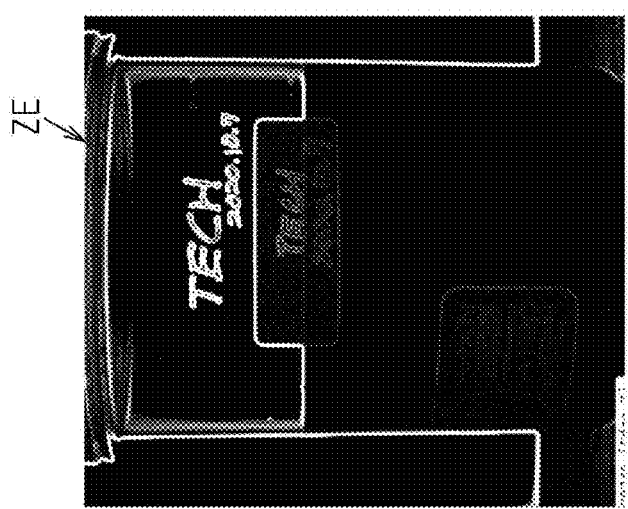
FIGS. 13A to 13C are diagrams showing an X outline image, a Y outline image, and a Z outline image, respectively.
Figure 13B:
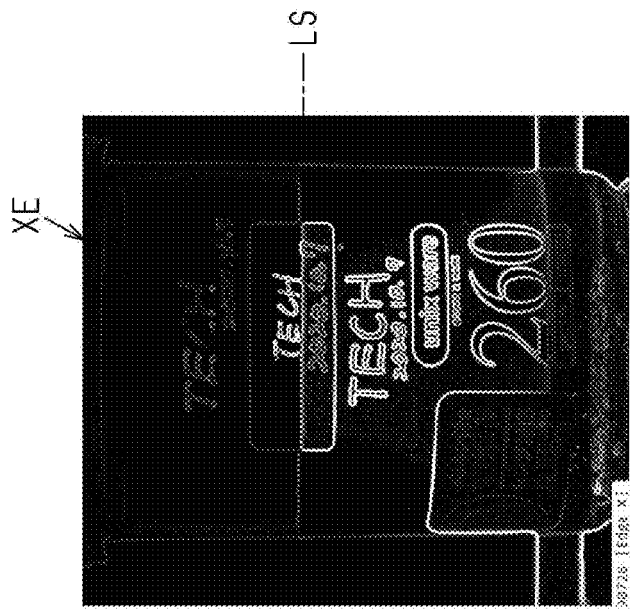
Figure 13A:
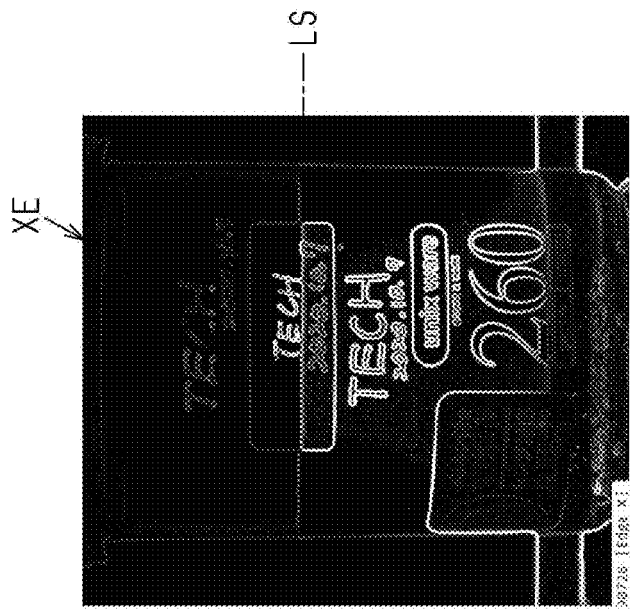

As indicated by the arrows of long-dash double-short-dash lines in FIG. 10, two or more of the image signals XS, YS, and ZS from the conversion unit 60 may be input to each of the inspection units 71 to 73 of the inspection processing unit 70 to generate an inspection image based on multiple image signals. For example, each of the inspection units 71 to 73 may obtain a difference image or an outline image from multiple types of image signals. FIGS. 13A to 13C show outline images obtained by the inspection units 71 to 73, respectively, from multiple types of image signals XS, YS, and ZS. The first inspection unit 71 generates an X outline image XE shown in FIG. 13A, and inspects the characters in the first area A1 using this X outline image XE. The second inspection unit 72 generates a Y outline image YE shown in FIG. 13B, and inspects the characters in the second area A2 using this Y outline image YE. The third inspection unit 73 generates a Z outline image ZE shown in FIG. 13C, and inspects the characters in the third area A3 using this Z outline image ZE.

In the inspection processing unit 70, each of the inspection units 71 to 73 determines the quality of the article 12. When the inspection results of the inspection units 71 to 73 indicate that the article 12 is defective, the inspection processing unit 70 drives the removal device to remove the defective article 12 from the conveyor 16.

The present embodiment uses an imaging method. The imaging method includes a light application step, a photographing step, and a conversion step. In the light application step, M types of light sources 21 to 23 (where M is a natural number that satisfies 2≤M≤N) apply visible light beams to the article 12. These visible light beams have emission spectra in the visible light range and mutually different wavelength ranges. In the photographing step, the camera 30 photographs the article 12 through the optical bandpass filter 31 disposed on the optical path between the image sensor 33 and the article 12. The camera 30 includes the image sensor 33 including the color filter 34, which is an example of a spectral optical filter of N bands (where N is a natural number greater than or equal to 3) having different spectral transmittance characteristics. The image sensor 33 has sensitivity to the visible light range and the near-infrared range. The conversion step separates the image signal captured by the image sensor 33 into signals of N bands and performs a matrix operation on the separated image signals of N bands to generate three bands of a first image signal XS, a second image signal YS, and a third image signal ZS having spectral sensitivity to the visible light range. The M types of light sources 21 to 23 individually apply light to the areas A1 to A3 at M locations of the article 12. The direction and the emission intensity of the light applied to the article 12 are individually selected for each imaging target area. The direction of light determines whether the image of each of the areas A1 to A3 at M locations captured by the camera 30 is formed by transmitted light or reflected light.

The first embodiment described in detail above has the following advantageous effects.

(1) The imaging device 15 includes the camera 30, the M types of light sources 21 to 23 (where M is a natural number that satisfies 2≤M≤N), the optical bandpass filter 31, and the conversion unit 60. The camera 30 includes the image sensor 33 including the color filter 34, which is an example of a spectral optical filter of N bands (where N is a natural number greater than or equal to 3) having different spectral transmittance characteristics. The image sensor 33 has sensitivity to the visible light range and the near-infrared range. The M types of light sources 21 to 23 have the emission spectral characteristics of having respective peaks in mutually different wavelength ranges within the visible light range and the near-infrared range. The optical bandpass filter 31 is disposed on the optical path between the image sensor 33 and the article 12 and configured to transmit light beams of mutually different wavelength ranges emitted from the M types of light sources 21 to 23. The conversion unit 60 generates image signals of M bands each having spectral sensitivity to the corresponding one of the mutually different wavelength ranges, by separating the imaging signal obtained by the image sensor 33 when the article 12 is photographed with the camera 30 into imaging signals of N bands and performing a matrix operation on the separated imaging signals of N band. The M types of light sources 21 to 23 individually apply light to the areas A1 to A3, which are examples of imaging target areas at M locations of the article 12. The direction and the emission intensity of the light applied to the article 12 are individually selected for each of the areas A1 to A3. The direction of light determines whether the image of each of the areas A1 to A3 at M locations captured by the camera 30 is formed by transmitted light or reflected light. Based on the image signals of M bands, M captured images of the areas A1 to A3 at M locations are individually generated. Thus, the light application intensity can be individually set for each of the areas A1 to A3 with different optical characteristics of the article 12. This allows the images of the areas A1 to A3 to be simultaneously captured at the same angle of view with the single camera 30 and a simple configuration.

(2) The camera 30 is a general-purpose color camera 30 from which an infrared cut-off filter has been removed. The use of the general-purpose color camera 30 as the camera 30 simplifies the configuration of the imaging device 15.

(3) The M light sources 21 to 23 include two types of light sources having the emission spectral characteristics of having respective peaks in two different wavelength ranges within the visible light range. The image signals of M bands are image signals of three or more bands and include a first image signal, which has spectral sensitivity to a first wavelength range that is one of the two wavelength ranges, a second image signal, which has spectral sensitivity to a second wavelength range of the other, and a third image signal, which has spectral sensitivity to a third wavelength range different from both the first and second wavelength ranges. Thus, image signals of three or more bands obtained by photographing multiple locations with different optical characteristics of the article 12 using lights with different intensities can be obtained by photographing the article 12 in one shot.

(4) The article 12 to be photographed with the camera 30 has an area with optical transparency. The M types of light sources 21 to 23 apply M types of light beams at times including a period during which the light beams are simultaneously applied to the different areas of the article 12. The camera 30 photographs the article 12 in one shot. As such, images of multiple locations with different optical characteristics of the article 12 can be photographed in one shot with the single camera 30 and a simple configuration.

(5) The M types of light sources 21 to 23 include at least two types of the first light source 21 disposed at a position on the opposite side of the article 12 from the camera 30, the second light source 22 disposed at a position on the same side of the article 12 as the camera 30, and the third light source 23 disposed at a position on the opposite side of the article 12 from the camera 30. The camera 30 captures at least two of a first image of transmitted light emitted from the first light source 21 and transmitted through the article 12, a second image of reflected light emitted from the second light source 22 and reflected on the article 12, and a third image of transmitted light emitted from the third light source 23 and transmitted through the article 12. This allows images of at least two locations with different optical characteristics of the article 12 to be effectively obtained.

(6) The inspection device 11 includes the imaging device 15 and the inspection processing unit 70, which inspects the article 12 based on the image signals of M bands output by the imaging device 15. Thus, images of multiple locations with different optical characteristics of the article 12, which is the subject, can be simultaneously captured at the same angle of view using the single camera 30 and a simple configuration. The light intensity of each of the M types of light sources 21 to 23 can be adjusted as appropriate without the need for significant consideration given to the influence of light on other imaging target areas. This allows multiple locations with different optical characteristics of the article 12 to be inspected with a simple process.

(7) The article 12 is the container 12A containing the liquid LQ and including an area with optical transparency. The inspection processing unit 70 inspects the characters on the outer surface of the container 12A. The inspection processing unit 70 performs at least two of the inspection of the characters C1 on an area of the container 12A that overlaps with the liquid LQ, the inspection of the characters C2 on the label 12L affixed to the outer surface of the container 12A, and the inspection of the characters C3 on an area of the container 12A that does not overlap with the liquid LQ. This allows multiple locations with different optical characteristics of the article 12 to be suitably inspected with a simple configuration.

(8) An imaging method for photographing the article 12 with the camera 30 and generating an image signal includes a light application step, a photographing step, and a conversion step. Accordingly, this imaging method has the same advantageous effects as the imaging device 15.

Second Embodiment

Figure 14A:
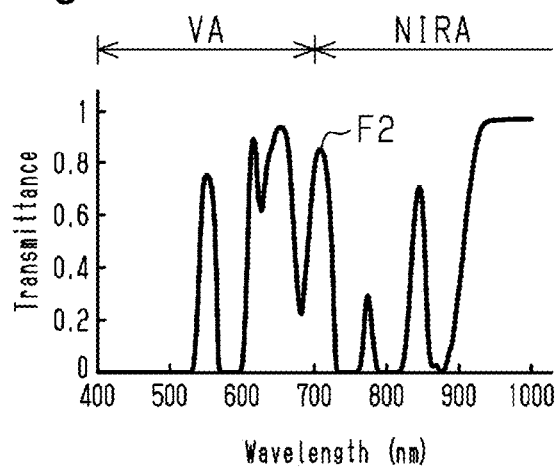
FIG. 14A is a graph showing the light transmittance characteristic of an optical bandpass filter of a second embodiment.
Figure 14B:
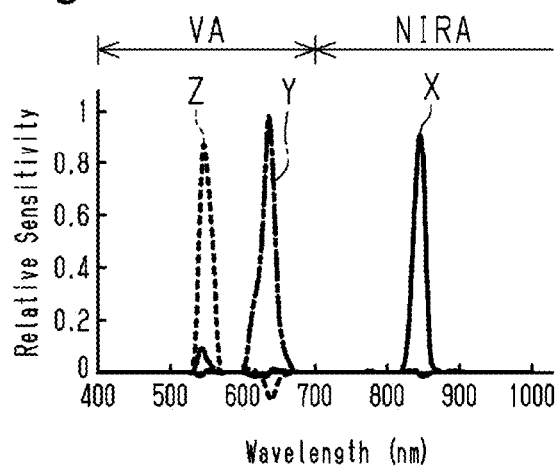
FIG. 14B is a graph showing the relative output characteristic of each band of a second imaging signal obtained using a near-infrared light source.
Figure 15:
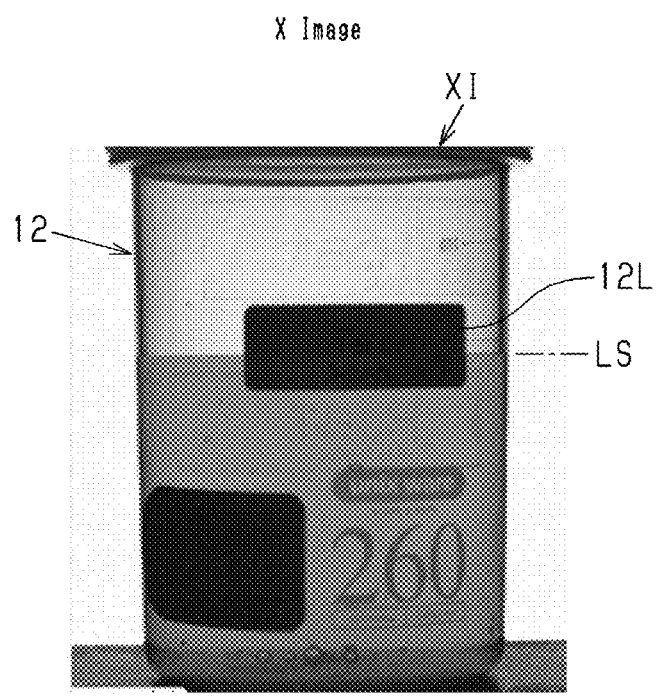
FIG. 15 is a diagram showing an X image obtained through photographing using a near-infrared light source as the single light source.

Referring to FIGS. 14A to 15, a second embodiment is now described. The second embodiment is an example in which one of the M types of light sources 21 to 23 in FIGS. 1 and 2 is a near-infrared light source that emits near-infrared light. In particular, the first light source 21 or the third light source 23 of this example is a near-infrared light source that applies near-infrared light to the article 12. In the following description, a configuration is described as an example in which the first light source 21, which applies light to the first area A1, is a near-infrared light source. In the first area A1, an image of foreign matter in the liquid LQ in the container 12A may be captured. The camera 30 has the same configuration as that of the first embodiment.

In FIGS. 1 and 2, the near-infrared light source as the first light source 21 is positioned on the opposite side of the article 12 at the imaging position from the camera 30. The first light source 21 applies near-infrared light to the first area A1 of the article 12. The camera 30 captures an image of near-infrared light transmitted through the first area A1 of the article 12. The presence or absence of foreign matter in the article 12 is inspected by photographing the article 12 with transmitted near-infrared light.

The first light source 21, which is a near-infrared light source, has an emission spectrum in the near-infrared wavelength range NIRA and does not have an emission spectrum in the visible light range. The first light source 21 includes a first light emitting unit 21a, which emits near-infrared light. The first light emitting unit 21a may be an LED, for example.

The emission spectrum of the first light source 21 has a peak in the transmission wavelength range of the optical bandpass filter 31. According to the transmittance characteristic curve F2 of the optical bandpass filter 31 shown in FIG. 14A, there is one peak between about 820 and 870 nm in the near-infrared wavelength range NIRA, and there is a transmitting range with about 100% transmittance in the range above about 880 nm. The emission spectrum of the first light source 21 of this embodiment has one peak between about 820 and 870 nm.

FIG. 14B shows the X signal, Y signal, and Z signal converted and output by the conversion unit 60 to which the R signal, G signal, and B signal having the above relative sensitivity are input. When the light with the emission spectrum of the combination of the three types of light sources 21 to 23 is incident, the image sensor 33 outputs RGB signals of three bands in which the emission intensity characteristics of the three types of light sources 21 to 23 and the relative sensitivity characteristics of the image sensor 33 are combined. This first imaging signal S1 is input to and converted by the conversion unit 60 into XYZ signals of three bands shown in the graph of FIG. 14B.

As shown in the graphs of FIGS. 14A and 14B, the X band has a peak between about 830 and 860 nm, the Y band has a peak between about 600 and 670 nm, and the Z band has a peak between about 530 and 550 nm. Each of the peaks of sensitivity indicated by the three bands of XYZ is higher than the relative sensitivity of the other two bands in the corresponding wavelength range, and the bands of XYZ are separated. The two bands Y and Z are visible light bands separated from each other, and the X band is a near-infrared light band separated from the two visible light bands.

FIG. 15 shows an X image XI captured with near-infrared light. As shown in FIG. 15, the X image XI is an image of light transmitted through the first area A1, which is below the liquid level LS, of the article 12, which is a container. The characters in the third area A3 above the liquid level LS are hardly visible. The near-infrared light is transmitted through the liquid in the first area A1 below the liquid level LS of the article 12. The label 12L, which does not transmit near-infrared light, is shaded (black in color). This allows for the inspection for foreign matter in the liquid in the area of the article 12 that does not overlap with the label 12L.

The second embodiment has the following advantageous effects, as well as the same advantageous effects as the first embodiment.

(9) The M types of light sources 21 to 23 include a light source 21, 22, or 23 having an emission spectral characteristic in a predetermined wavelength range within the near-infrared range. The image signals of M bands include an image signal having spectral sensitivity to a predetermined wavelength range in the near-infrared range. Thus, image signals of M bands including an image signal of the location of the article 12 that can be photographed with the illumination of near-infrared light is obtained by photographing the article 12 in one shot.

Modifications

Embodiments are not limited to the above, and may be modified as follows.

The first embodiment uses the three types of light sources 21 to 23, but two types of light sources may be used. For example, a combination of the first light source 21 and the second light source 22, a combination of the first light source 21 and the third light source 23, or a combination of the second light source 22 and the third light source 23 may be used.

In the second embodiment, the combination of the arrangement positions of the three light sources is merely an example, and the configuration in which one of the three types of light sources is a near-infrared light source may have other arrangement positions of the three types of light sources. For example, a combination in which the first light source 21 is a near-infrared light source or a combination in which the third light source 23 is a near-infrared light source may be used.

The second embodiment uses three types of light sources, but two types of light sources may be used. For example, a combination of the first light source 21 and the second light source 22, a combination of the first light source 21 and the third light source 23, or a combination of the second light source 22 and the third light source 23 may be used. One of the two types of light sources may be a visible light source, and the other may be a near-infrared light source. For example, a combination of a visible light source as the first light source 21 and a near-infrared light source as the second light source 22, a combination of a near-infrared light source as the second light source 22 and a visible light source as the third light source 23, and a combination of a visible light source as the first light source 21 and a near-infrared light source as the third light source 23 may be used.

In the second embodiment, the near-infrared light as the first light source 21 is arranged at the back side of the article 12, but the second light source 22 arranged at the front side of the article 12 may be a near-infrared light source. The ink printed directly on the outer surface of the article 12 or on the label 12L may include ink that reflects near-infrared light. The inspection device 11 including the imaging device 15 may inspect the ink that is printed on the subject and reflects infrared light. In this case, the camera 30 may be configured to photograph near-infrared light reflected on the surface of the article 12. The article 12 may include a print area printed on its surface using a mixture of an ink that reflects visible light and an ink that reflects infrared light. Alternatively, the article 12 may include a first print area printed using an ink that reflects visible light and a second print area printed using an ink that reflects near-infrared light.

The M types (for example, three types) of light sources 21 to 23 individually apply light to the different areas A1 to A3 of the subject, but light may be applied to other areas as long as light is applied at least to the target areas.

In the first embodiment, as shown in FIG. 9B, in the Z band, the Y band, which is a different band, has relative sensitivity greater than or equal to 0.2. Provided that the sharpness of the images of the areas A1 to A3 is not adversely influenced, the X or Y band may include a different band having a relative sensitivity greater than or equal to 0.2. Also, the characteristics of the optical bandpass filter 31 and matrix coefficients may be selected such that the relative sensitivity of other bands is less than 0.1.

In each of the above-described embodiments and modifications, the number of types of light sources is not limited to 3, and may be 4 or more or 2 as long as visible light or near-infrared light beams having mutually different emission spectra are emitted. Furthermore, one type, two types, three or more types of light emitting units may form the near-infrared light source.

The value of N is not limited to 3, and may be greater than or equal to 4. For example, when the color camera uses a primary color filter, four colors of R, G1, G2, and B may be used (N=4). The color camera may include a complementary color filter, and the complementary colors may be yellow, cyan, magenta, and green.

Image data (for example, RGB image data) based on the first imaging signal captured by the image sensor 33 through the optical bandpass filter 31 using the camera 30 may be stored in a removable memory such as a USB memory. The image data stored in the removable memory may be read by a personal computer, and the CPU (conversion unit 60) of the personal computer may perform conversion processing including a matrix operation to generate multiband images of multiple bands. That is, the device that performs the photographing step and the device that performs the conversion step may be separate devices. Multiband images of multiple bands may be obtained also by this imaging method.

The conversion unit 60 does not necessarily have to perform a matrix operation. For example, even when the optimum matrix coefficient is a unit matrix (100, 010, 001), the above embodiment performs matrix operation for conversion. However, the result of conversion would be the same as before the conversion, and this is practically the same as not converting. The matrix operation may therefore be omitted. In other words, although the imaging device includes a conversion unit, in some exceptional cases such as where the matrix coefficient is a unit matrix, the conversion unit may be configured so as not to perform matrix operation to reduce the load of calculation processing.

The imaging device 15 is not limited to the inspection application. For example, the imaging device 15 may be used as the eyes of a robot, and the robot may separately identify an image of visible light and an image of infrared light.

The images output by the imaging device 15 may be visually inspected by an inspector.

The number of colors of the color filter 34 forming the image sensor 33 is not limited to 3 or 4, and may be 5, 6, 7, or 8. At least one of the colors of the filter may block visible light and transmit non-visible light. For example, the image sensor 33 may include a color filter including an NIR filter, which transmits near-infrared light.

The article 12, which is an example of a subject to be imaged or inspected, is not limited to a container such as a PET bottle or other bottles. For example, the article 12 may be food, beverage, electronic components, electric appliances, commodities, parts, members, powder or liquid material, or the like. The article 12 may be any article whose quality can be inspected with multiband images.

The liquid does not have to have optical transparency. For example, the liquid may be opaque liquid of a predetermined color. Examples of this type of liquid include seasoning liquid, such as black colored sauce, drinking water of a predetermined color, chemical solution of a predetermined color, and oil of a predetermined color. The liquid may also include a non-fluid gel.

The arrangement pattern of the color filter forming the image sensor 33 is not limited to the RGB Bayer arrangement, and may be any arrangement pattern such as a stripe arrangement.

A part or whole of at least one of the control unit 50, the conversion unit 60, and the inspection processing unit 70 may be configured by computer software that executes a program, or may be configured by hardware such as an electronic circuit.

The imaging device 15 may be used for purposes other than inspection.

REFERENCE SIGNS LIST

10 . . . Inspection System; 11 . . . Inspection Device; 12 . . . Article as Example of Subject; 12A . . . Container; 12B . . . Cap; 12L . . . Label; 13 . . . Conveying Apparatus; 15 . . . Imaging Device; 16 . . . Conveyor; 17 . . . Sensor; 21 . . . First Light Source; 21a . . . First Light Emitting Unit; 22 . . . Second Light Source; 22a . . . Second Light Emitting Unit; 23 . . . Third Light Source; 23a . . . Third Light Emitting Unit; 30 . . . Camera; 30a . . . Lens Barrel; 31 . . . Optical Bandpass Filter as Example of Optical Filter; 32 . . . Lens; 33 . . . Color Image Sensor (Image Sensor); 33R . . . R Light Receiving Element; 33G . . . G Light Receiving Element; 33B . . . B Light Receiving Element; 34 . . . Color Filter as Example of Spectral Optical Filter; 34R . . . R Filter; 34G . . . G Filter; 34B . . . B Filter; 40 . . . Control Processing Unit; 41 . . . Display Unit; 50 . . . Control Unit; 60 . . . Conversion Unit; 61 . . . RGB Separation Unit; 62 . . . XYZ Conversion Unit; 70 . . . Inspection processing unit; 71 . . . First Inspection Unit; 72 . . . Second Inspection Unit; 73 . . . Third Inspection Unit; 201 . . . Infrared Cut-Off Filter (IR Cut-Off Filter); LR . . . Emission Spectrum; LG . . . Emission Spectrum; LB . . . Emission Spectrum; A1 . . . First Area as Example of Imaging Target Area; A2 . . . Second Area as Example of Imaging Target Area; A3 . . . Third Area as Example of Imaging Target Area; LQ . . . Liquid; C1 . . . First Character; C2 . . . Second Character; C3 . . . Third Character; S1 . . . First Imaging Signal; S2 . . . Second Image Signal; XS . . . First Image Signal; YS . . . Second Image Signal; ZS . . . Third Image Signal; VA . . . Visible Light Wavelength Range; NIRA . . . Near-Infrared Wavelength Range

The invention claimed is:

1. An imaging device comprising:
a camera including an image sensor including a spectral optical filter of N bands (where N is a natural number greater than or equal to 3) with different spectral transmittance characteristics, wherein the image sensor has sensitivity to a visible light range and a near-infrared range;
M types of light sources (where M is a natural number that satisfies 2≤M≤N) with emission spectral characteristics of having respective peaks in mutually different wavelength ranges within the visible light range and the near-infrared range;
an optical filter that is disposed on an optical path between the image sensor and a subject and configured to transmit light beams of the mutually different wavelength ranges from the M types of light sources; and
a conversion unit configured to generate image signals of M bands each having spectral sensitivity to a corresponding one of the mutually different wavelength ranges by separating an imaging signal obtained by the image sensor when the subject is photographed with the camera and performing a matrix operation on the separated imaging signals of N bands, wherein:
the M types of light sources are configured to individually apply light to imaging target areas at M locations of the subject, and
a direction in which light is applied to the subject that determines whether an image of a corresponding one of the imaging target areas at M locations captured by the camera is formed by transmitted light or reflected light and an emission intensity are individually selected for each of the imaging target areas.

2. The imaging device according to claim 1, wherein the camera is a general-purpose color camera from which an infrared light cut-off filter has been removed.

3. The imaging device according to claim 1, wherein:
the M types of light sources include two types of light sources having emission spectral characteristics of having respective peaks in two different wavelength ranges within the visible light range, and
the image signals of M bands are image signals of three or more bands and include a first image signal having spectral sensitivity to a first wavelength range that is one of the two wavelength ranges, a second image signal having spectral sensitivity to a second wavelength range that is the other of the two wavelength ranges, and a third image signal having spectral sensitivity to a third wavelength range different from both the first wavelength range and the second wavelength range.

4. The imaging device according to claim 1, wherein:
the M types of light sources include a light source having an emission spectral characteristic in a predetermined wavelength range within the near-infrared range, and
the image signals of M bands include an image signal having spectral sensitivity to the predetermined wavelength range within the near-infrared range.

5. The imaging device according to claim 1, wherein:
the subject to be photographed with the camera includes an area with optical transparency,
the M types of light sources are configured to apply the M types of light beams at times including a period during which the light beams are simultaneously applied to the imaging target areas at M locations of the subject, and
the camera is configured to photograph the subject in one shot.

6. The imaging device according to claim 5, wherein:
the M types of light sources include at least two of a first light source disposed at a position on an opposite side of the subject from the camera, a second light source disposed at a position on a same side of the subject as the camera, or a third light source disposed at a position on the opposite side of the subject from the camera, and
the camera is configured to capture at least two of a first image of transmitted light emitted from the first light source and transmitted through the subject, a second image of reflected light emitted from the second light source and reflected on the subject, or a third image of transmitted light emitted from the third light source and transmitted through the subject.

7. An inspection device comprising:
the imaging device according to claim 1; and
an inspection processing unit configured to inspect the subject based on the image signals of M bands output from the imaging device.

8. The inspection device according to claim 7, wherein:
the subject is a container containing liquid and including an area with optical transparency,
the inspection processing unit is configured to inspect characters on an outer surface of the container, and
the inspection device is configured to perform at least two of inspection of the characters on an area of the container that overlaps with the liquid, inspection of the characters on an area of the container that does not overlap with the liquid, or inspection of characters on a label affixed to the outer surface of the container.

9. An imaging method for photographing a subject with a camera and generating an image signal, the method comprising:
a light application step of applying light to the subject with M types of light sources (where M is a natural number that satisfies 2≤M≤N) having emission spectral characteristics of having respective peaks in mutually different wavelength ranges within a visible light range and a near-infrared range;
a photographing step of photographing imaging target areas at M locations of the subject through an optical filter configured to transmit light beams of the mutually different wavelength ranges from the M types of light sources and with the camera including an image sensor including a spectral optical filter of N bands (where N is a natural number greater than or equal to 3) with different spectral transmittance characteristics, wherein the image sensor has sensitivity to the visible light range and the near-infrared range; and
a conversion step of generating image signals of M bands each having spectral sensitivity to a corresponding one of the mutually different wavelength ranges by separating an imaging signal captured by the image sensor into imaging signals of N bands and performing a matrix operation on the separated imaging signals of N bands,
and further wherein:
the M types of light sources individually illuminate the imaging target areas at M locations of the subject, and
a direction in which light is applied to the subject that determines whether an image of a corresponding one of the imaging target areas at M locations captured by the camera is formed by transmitted light or reflected light and an emission intensity are individually selected for each of the imaging target.

* * * * *